US012391066B2

(12) United States Patent
Tsiberidis

(10) Patent No.: US 12,391,066 B2
(45) Date of Patent: Aug. 19, 2025

(54) EMERGENCY WHEEL ATTACHMENT FOR A VEHICLE WHEEL

(71) Applicant: GV ENGINEERING GMBH, Heimsheim (DE)

(72) Inventor: Konstantinos Tsiberidis, Untergruppenbach (DE)

(73) Assignee: GV ENGINEERING GMBH, Heimsheim (DE)

( * ) Notice: Subject to any disclaimer, the term of this patent is extended or adjusted under 35 U.S.C. 154(b) by 446 days.

(21) Appl. No.: 17/801,874

(22) PCT Filed: Feb. 24, 2021

(86) PCT No.: PCT/EP2021/054558
§ 371 (c)(1),
(2) Date: Aug. 24, 2022

(87) PCT Pub. No.: WO2021/170657
PCT Pub. Date: Sep. 2, 2021

(65) Prior Publication Data
US 2023/0098604 A1  Mar. 30, 2023

(30) Foreign Application Priority Data
Feb. 28, 2020 (DE) .......................... 102020001324.4

(51) Int. Cl.
*B60B 11/10* (2006.01)
*B60C 7/28* (2006.01)
*B60C 17/00* (2006.01)

(52) U.S. Cl.
CPC ................ *B60B 11/10* (2013.01); *B60C 7/28* (2013.01); *B60C 17/00* (2013.01); *B60B 2310/307* (2013.01); *B60B 2900/731* (2013.01)

(58) Field of Classification Search
CPC ........... B60C 17/00; B60C 7/28; B60B 11/10; B60B 7/063; B60B 15/10; B60B 15/16; B60B 15/26; B60B 15/263; B60B 15/266
(Continued)

(56) References Cited

U.S. PATENT DOCUMENTS

| 2016/0032558 A1 | 2/2016 | Congdon |
| 2016/0325583 A1 | 11/2016 | Fittante |

(Continued)

FOREIGN PATENT DOCUMENTS

| CN | 102582378 A | 7/2012 |
| CN | 202693338 U | 1/2013 |

(Continued)

OTHER PUBLICATIONS

International Search Report and Written Opinion completed May 21, 2021 and issued in connection with PCT/EP2021/054558.

(Continued)

*Primary Examiner* — S. Joseph Morano
*Assistant Examiner* — Alex Palmer
(74) *Attorney, Agent, or Firm* — Barnes & Thornburg LLP

(57) ABSTRACT

An emergency wheel attachment is provided for attachment to an outside of a vehicle wheel so as to enable a driving operation with restricted tire function, and includes an annular mounting unit configured to mount the emergency wheel attachment on the vehicle wheel, and an annular tread unit configured to contact, in the operating state of the emergency wheel attachment, a road on which the vehicle wheel is intended to roll. The annular mounting unit has at least two retaining claws configured to fasten the annular mounting unit to a rim of the vehicle wheel, an annular actuating element forming part of a gear mechanism configured to convert rotation of the annular actuating element (Continued)

Figure 1:
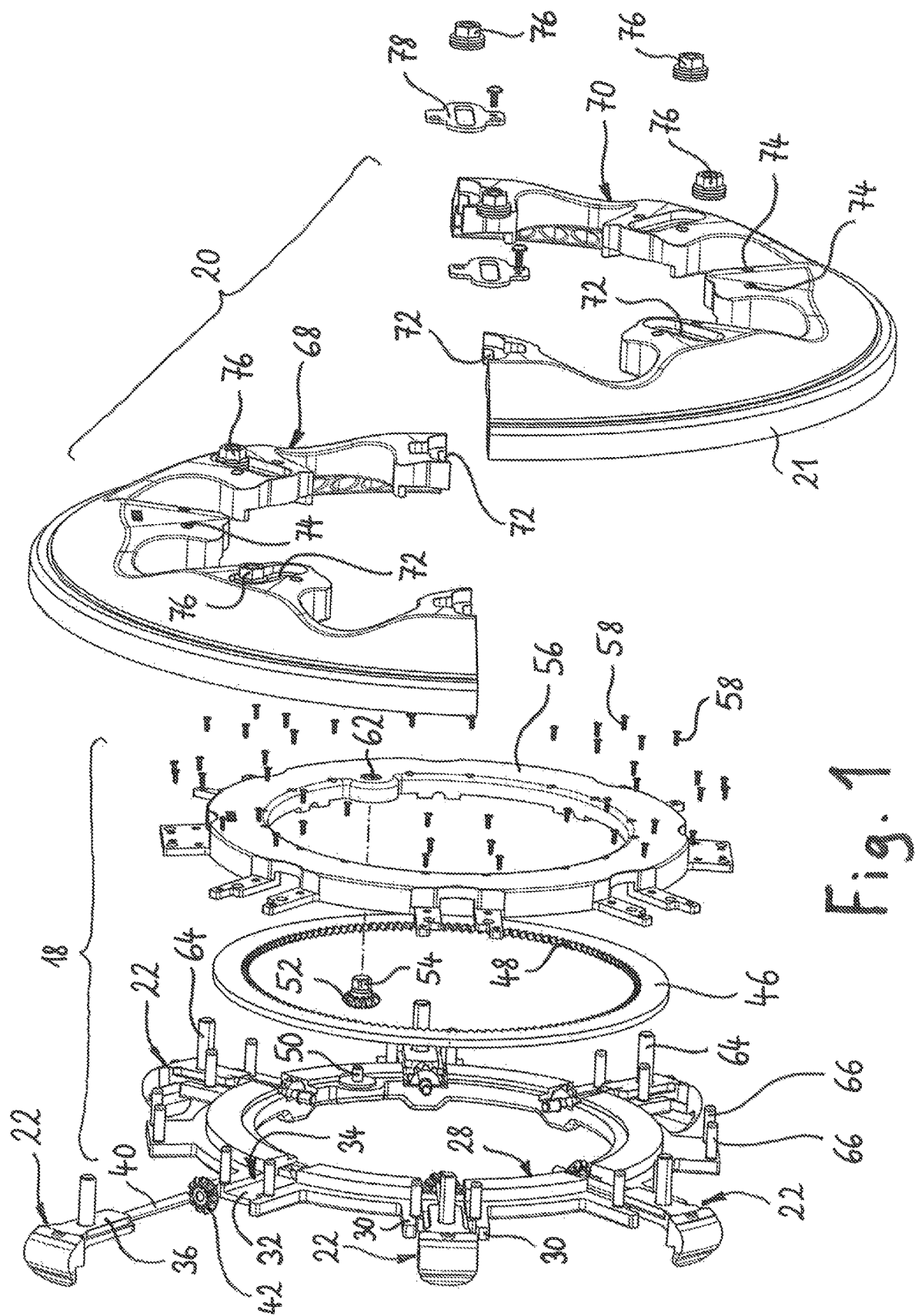

into radial movement of the retaining claws, and a drive device configured to be coupled to the annular actuating element and the actuation of which causes a rotation of the annular actuating element.

33 Claims, 23 Drawing Sheets

(58) Field of Classification Search
USPC .......... 301/39.1, 40.1, 40.2, 40.3, 40.4, 38.1
See application file for complete search history.

(56) References Cited

U.S. PATENT DOCUMENTS

| | | |
|---|---|---|
| 2020/0086683 A1 | 3/2020 | Tsiberidis |
| 2020/0164682 A1 | 5/2020 | Tsiberidis |
| 2021/0053391 A1 | 2/2021 | Tsiberidis |
| 2022/0041011 A1 | 2/2022 | Tsiberidis |

FOREIGN PATENT DOCUMENTS

| | | | |
|---|---|---|---|
| CN | 103144332 A | | 6/2013 |
| CN | 106114054 A | | 11/2016 |
| CN | 108725090 A | * | 11/2018 |
| CN | 109365973 A | | 2/2019 |
| CN | 110582413 A | | 12/2019 |
| FR | 2620977 A1 | | 3/1989 |
| GB | 857897 | | 1/1961 |
| JP | H03130655 | | 6/1991 |
| JP | H03197212 | | 8/1991 |
| JP | H0486506 A | | 3/1992 |
| JP | 2017505257 | | 2/2017 |
| JP | 2022514972 | | 2/2022 |
| WO | 2018138341 A1 | | 8/2018 |
| WO | 2019141817 A1 | | 7/2019 |

OTHER PUBLICATIONS

International Preliminary Report on Patentability mailed Feb. 16, 2022 and issued in connection with PCT/EP2021/054558.
Chinese Office Action for Application No. 202180017710.3 Dated Aug. 20, 2023 (9 Pages).
Japanese Office Action for patent application No. JP2022552162, dated Feb. 4, 2025. English Translation.
Japanese Office Action for patent application No. JP2022552162, dated Jul. 1, 2025. English Translation.

* cited by examiner

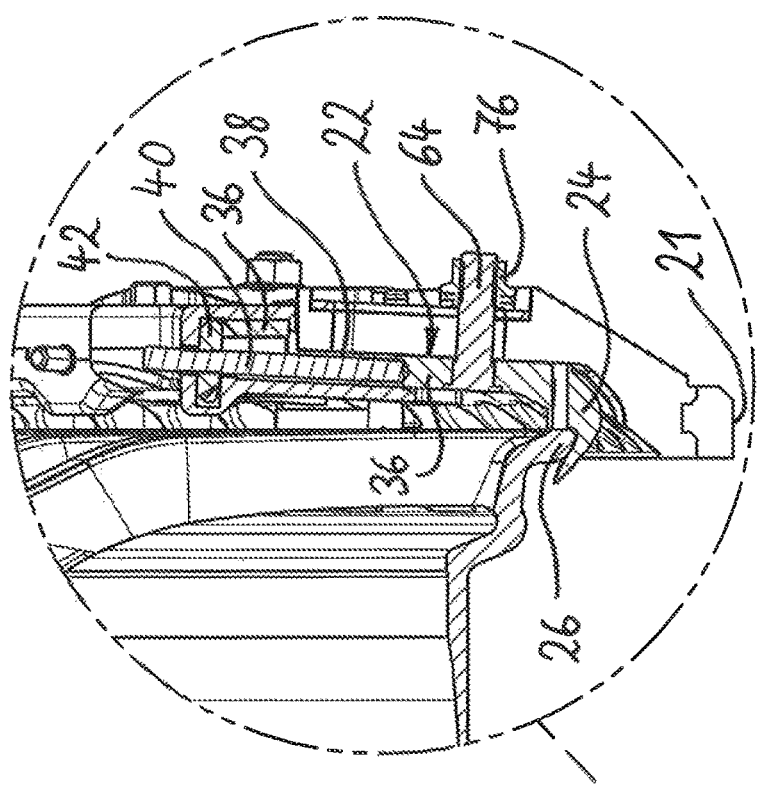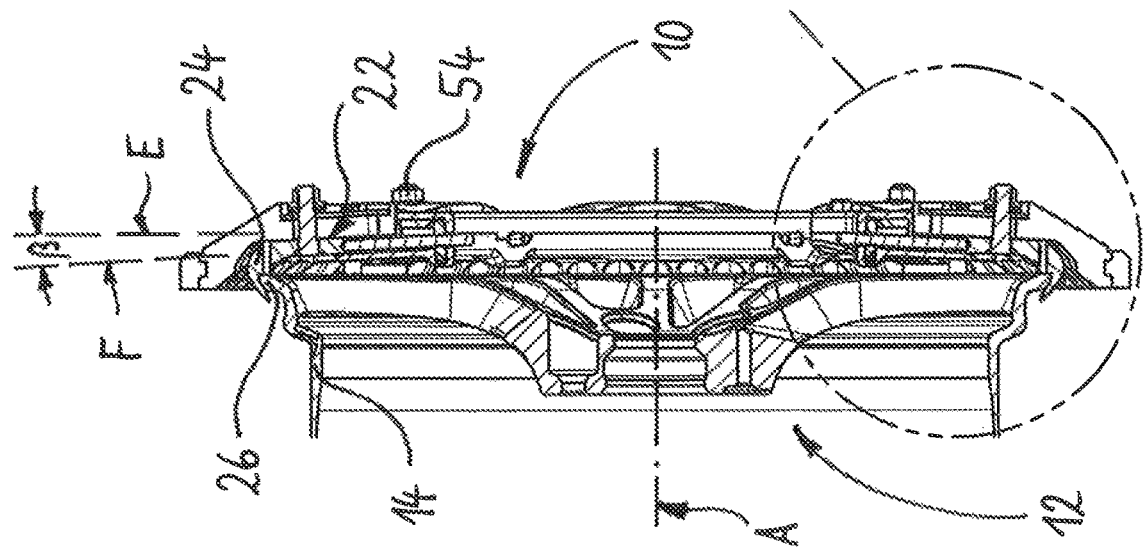
Fig. 4

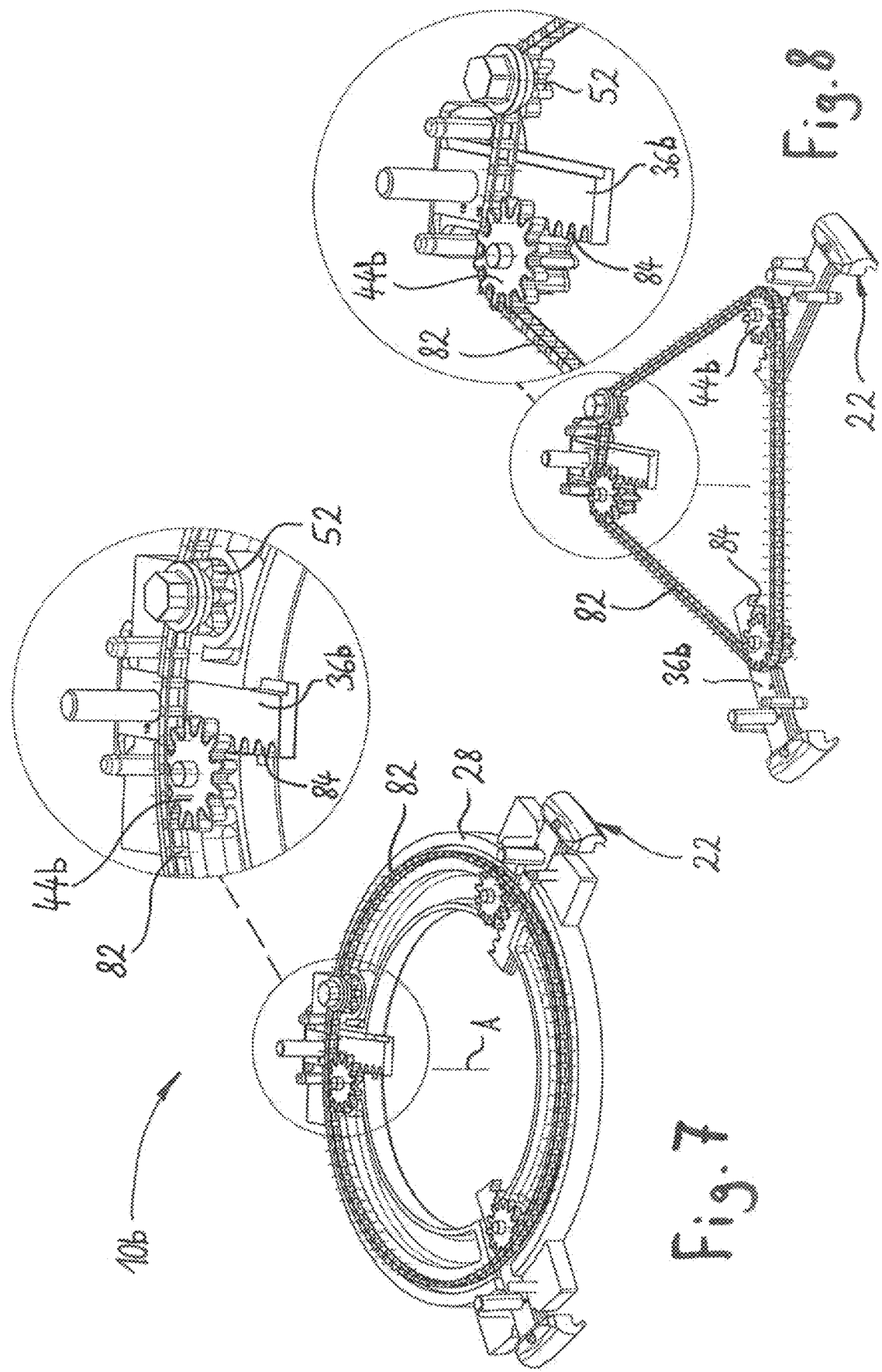

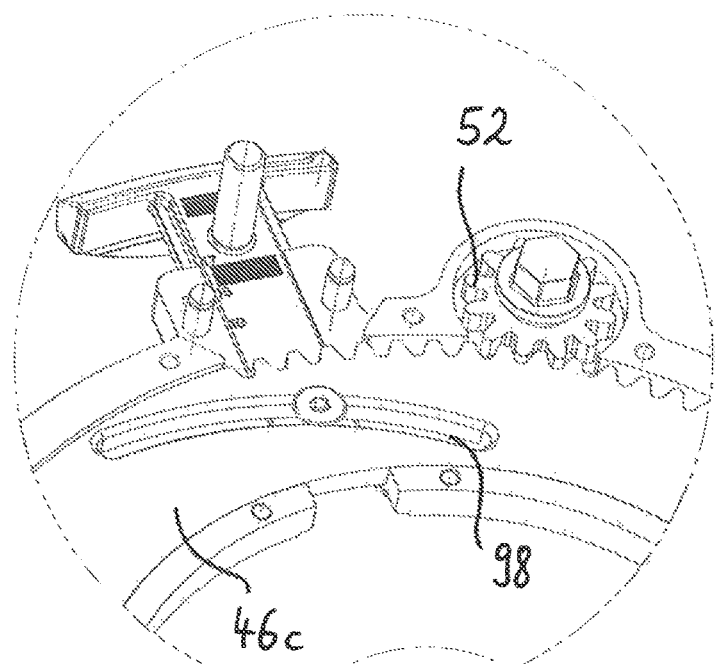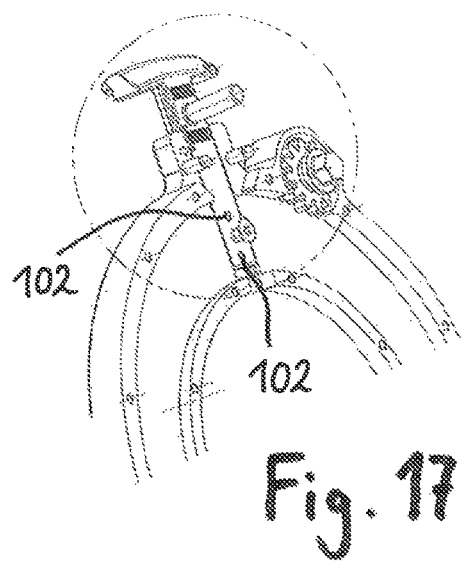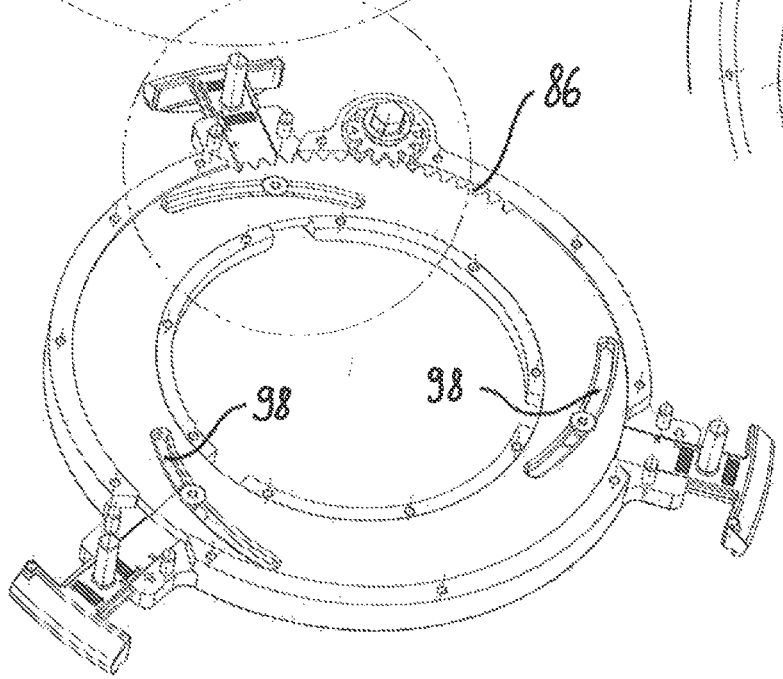
Fig. 17
Fig. 16

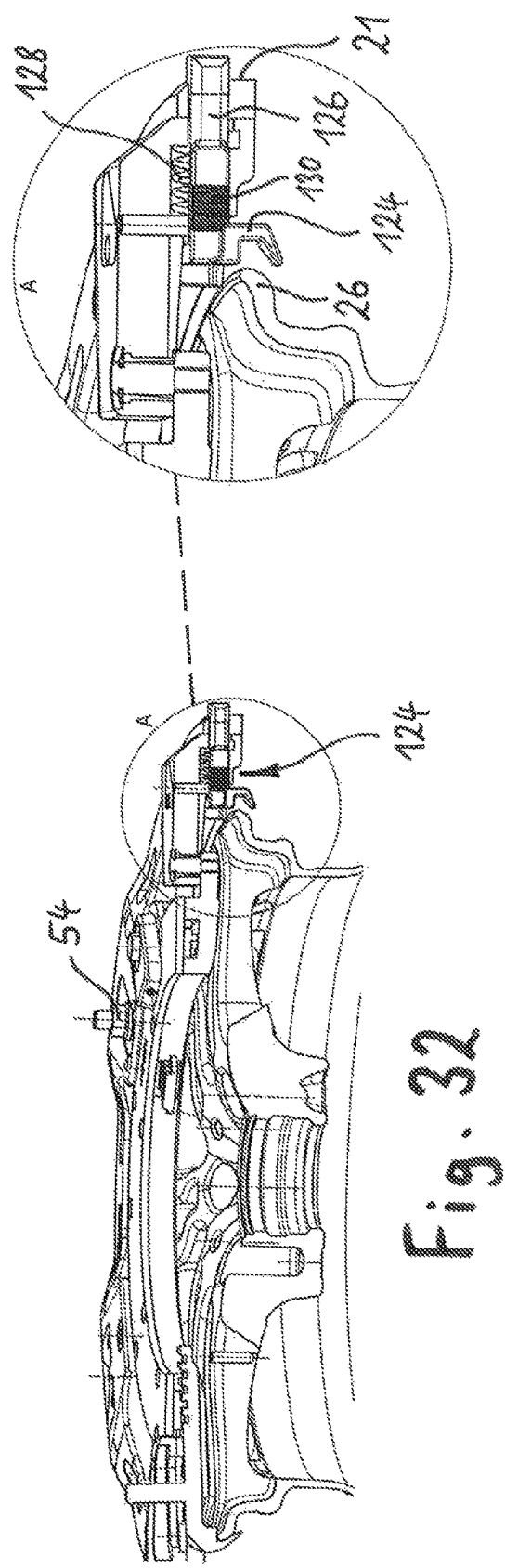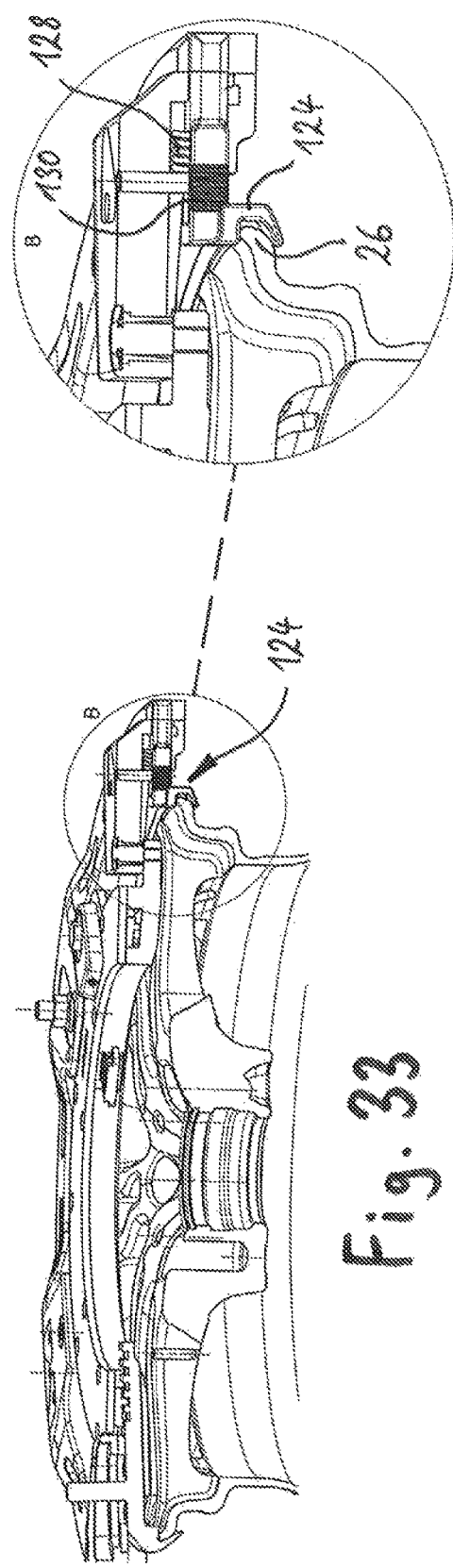
Fig. 32
Fig. 33

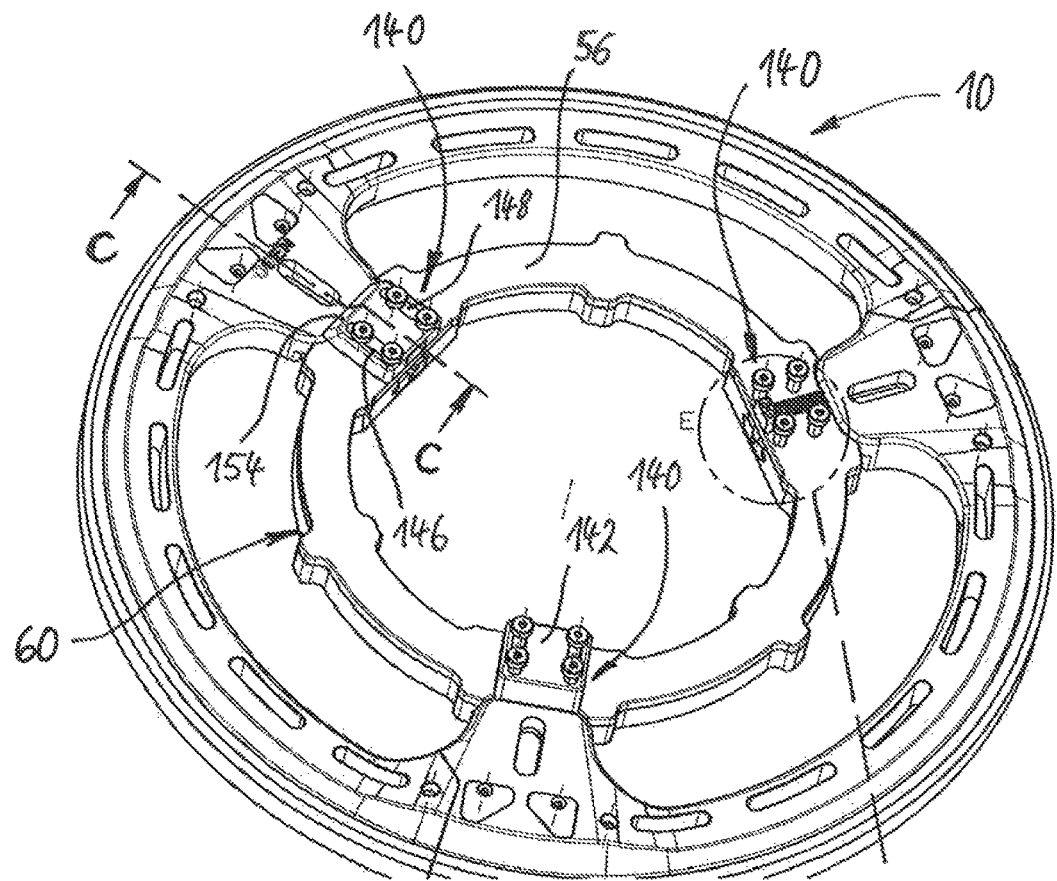
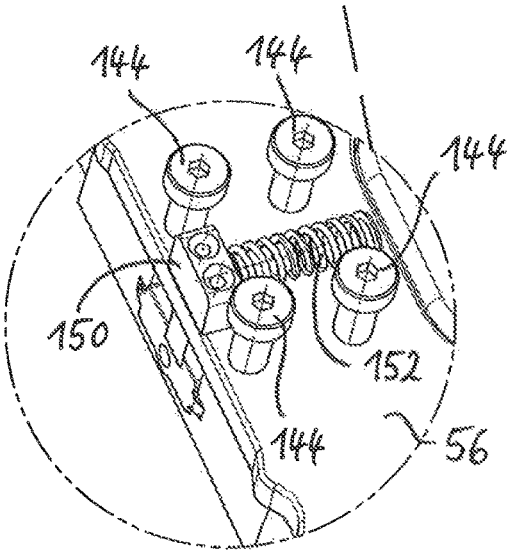
Fig. 37
Fig. 38

EMERGENCY WHEEL ATTACHMENT FOR A VEHICLE WHEEL

CROSS-REFERENCE TO RELATED APPLICATIONS

This is a national stage entry of International Patent Application No. PCT/EP2021/054558, filed Feb. 24, 2021, which claims the benefit of and priority to German Patent Application No. 10 2020 001 324.4, filed Feb. 28, 2020, the disclosures of which are expressly incorporated herein by reference in their entireties.

The invention relates to an emergency wheel attachment for a vehicle wheel, which comprises a rim and a tire arranged on the rim, wherein the emergency wheel attachment is intended to be placed onto the outside of the vehicle wheel. An emergency wheel attachment of this kind is conceived to permit continued driving of a vehicle on which a tire is damaged and can therefore no longer hold air. In such a case, the defective vehicle wheel must normally be removed from the vehicle and replaced by a spare wheel. The emergency wheel attachment according to the invention, on the other hand, is intended to be placed onto the outside of the defective vehicle wheel and thus avoids the need of having to change the defective vehicle wheel.

In connection with such an emergency wheel attachment, it is particularly important that the emergency wheel attachment can be fitted easily and yet extremely securely to a vehicle wheel, because in a subsequent operating state of a vehicle wheel provided with the emergency wheel attachment, significant forces act on the emergency wheel attachment and the latter must not under any circumstances become detached unintentionally from the vehicle wheel. Such an emergency wheel attachment should also be able to be implemented in as compact and lightweight a manner as possible, so as not to increase excessively the energy consumption of a vehicle in which such an emergency wheel attachment is carried.

The object of the invention is therefore to specify an emergency wheel attachment for a vehicle wheel that can be fitted easily and nevertheless securely on a vehicle wheel and that can at the same time be executed in a compact and lightweight manner.

This object is achieved according to the invention by an emergency wheel attachment for a vehicle wheel having a substantially annular mounting unit, which is used to mount the emergency wheel attachment to the vehicle wheel, and a substantially annular tread unit, which in the operating state of the emergency wheel attachment contacts a road on which the vehicle wheel provided with the emergency wheel attachment is intended to roll. By "substantially annular" mounting unit and tread unit it is meant here that the basic shape of the mounting unit and the tread unit is annular, which does not exclude, however, that portions extend from each of the mounting unit and the tread unit that are not related to the annular shape. The mounting unit, for example, is thus provided with at least two retaining claws, which are designed to attach the mounting unit to the rim of the vehicle wheel by engaging behind the rim flange of the rim. Embodiments of the inventive emergency wheel attachment usually have more than just two retaining claws, for example three, four, five or even six retaining claws. At least one of the retaining claws present is executed to be radially movable so that its distance from a center point of the mounting unit can be changed. Depending on the embodiment, several or even all retaining claws can be executed to be radially movable. The radial mobility of the at least one retaining claw makes it possible to arrange this retaining claw or all radially movable retaining claws initially in a position lying radially further out, in order to be able to place the mounting unit onto the rim of the vehicle wheel in this state. By subsequently changing the radial position of the or all radially movable retaining claws radially inwards, the retaining claws then engage behind the rim flange of the rim and the mounting unit is braced on the rim. The mounting unit has for this purpose an annular actuating element, which is rotatable about an axis that coincides in the operating state of the emergency wheel attachment (when the emergency wheel attachment is attached to the vehicle wheel) with the vehicle wheel axis. The annular actuating element forms part of a gear mechanism, which converts a rotation of the actuating element into a translatory radial movement of the or all radially movable retaining claws. To be able to set the actuating element in rotation, the mounting unit is further provided with a drive device, which is coupled or can be coupled to the actuating element and the actuation of which leads to rotation of the actuating element.

In some embodiments of the inventive emergency wheel attachment, the annular actuating element is a chain and the drive device is a rotatable drive pinion, which meshes or can be brought to mesh with the chain.

If the annular actuating element is a chain, then according to one embodiment, each radially movable retaining claw is provided with a retaining arm, which runs radially inwards from the retaining claw and has on one side rack-like teeth, which mesh with a rotatable transmission pinion associated with the retaining claw, which pinion in turn meshes with the chain. In an embodiment of this kind, a rotation of the drive pinion is transmitted to the chain, which thereby moves in a circumferential direction and transmits this movement to the transmission pinion or pinions, the rotation of which transmission pinion or pinions is converted by means of the rack-like teeth present on each movable retaining claw into a radial movement of each movable retaining claw which runs either radially inwards or radially outwards depending on the direction of rotation of the drive pinion.

To receive or carry the chain, the drive pinion and the or all transmission pinion(s), the mounting unit can have a suitably shaped housing.

In other embodiments of the inventive emergency wheel attachment, the actuating element is an at least substantially annular actuating disc. This actuating disc can have internal teeth or external teeth and the drive device can be a rotatable drive pinion, as explained previously in connection with the chain, which pinion meshes or can be brought to mesh with the internal teeth or the external teeth to be able to set the actuating disc in rotation.

In such embodiments, the actuating disc can be provided with an annular array of recesses or openings and a pinion can be associated with each movable retaining claw, which pinion meshes with the recesses or openings in the actuating disc and is connected to a threaded spindle, which in turn is connected to an associated retaining claw and which converts a rotary movement of the pinion into an at least substantially radially directed translatory movement of the retaining claw. The recesses or openings are preferably slot-shaped and extend mainly in a radial direction. Such an actuating disc is similar in appearance to what is termed a resolver wheel such as is used in connection with speed sensors, but has an entirely different function.

In other embodiments, the actuating disc has internal teeth and external teeth, wherein the rotatable drive pinion meshes or can be brought to mesh with the external teeth and associated with each radially movable retaining claw is a gearwheel designed in particular as a bevel gear, which meshes with the internal teeth of the actuating disc and is connected to a threaded spindle, which in turn is connected to an associated retaining claw and converts a rotary movement of the (bevel) gearwheel into an at least substantially radially directed translatory movement of the retaining claw. In an embodiment of this kind, the rotatable drive pinion of the mounting unit is located at a point somewhat radially outside of the actuating disc, whereby a central free space in the middle of the mounting unit can be maximised. This can be advantageous in connection with vehicle wheel rims that have what is known as excessive dishing, i.e. for rims with a central region that protrudes further axially than radially outer regions of the rim. If the mounting unit has a central free region that is as big as possible, the mounting unit can then be fitted tightly on the vehicle wheel without colliding with the rim, even on rims that have excessive dishing.

If a free central region as big as possible is not so important, then in a modification of the aforesaid embodiment, the rotatable drive pinion of the mounting unit can mesh with the internal teeth. The external teeth of the actuating disc can then be omitted.

In other embodiments of the inventive emergency wheel attachment, the actuating disc has internal teeth or external teeth and the drive device is again a rotatable drive pinion, which meshes or can be brought to mesh with the internal teeth or the external teeth similar to the modification explained above. To convert the rotary movement of the actuating disc to a translatory movement of each movable retaining claw, each movable retaining claw is provided with a retaining arm, which runs radially inwards from the retaining claw and has rack-like teeth on one side that mesh with a rotatable transmission pinion associated with the retaining claw, which pinion in turn meshes with the internal teeth or the external teeth of the actuating disc. This embodiment resembles an embodiment described further above in which the actuating element is configured as a chain. In both this embodiment described further above and the last described embodiment, the transmission pinion or one of the transmission pinions can function simultaneously as a drive pinion. In other words, instead of a drive pinion arranged separately, the transmission pinion or one of the transmission pinions can be the drive pinion at the same time. A housing of the mounting unit can be executed more simply in this way, as separate bearing of the drive pinion is eliminated and components can be saved.

In certain embodiments in which the actuating element of the mounting unit is designed as an annular actuating disc, the actuating disc has at least one gate or motion link in the shape of a spiral segment that interacts with a link block, which is arranged on a retaining arm connected to a radially movable retaining claw. If the actuating disc with the at least one motion link in the shape of a spiral segment is rotated, its movement is transmitted via the link block running in or on the motion link to the associated retaining claw and ensures that the retaining claw changes its distance from the center point of the mounting unit. Each radially movable retaining claw is thereby guided so that it can move only in a radial direction but not in a circumferential direction.

If the actuating disc has only one motion link in the shape of a spiral segment, then if a number of radially movable retaining claws are arranged distributed in the circumferential direction of the mounting unit, each retaining claw must be configured specially for the associated circumferential position so that all radially movable retaining claws have the same radial spacing from the center of the mounting unit in an initial position of the actuating disc. In an embodiment of this kind, each radially movable retaining claw must accordingly be mounted at a quite definite point associated with it when the mounting unit is assembled.

Instead of a single motion link in the shape of a spiral segment, however, the actuating disc can also have several motion links in the shape of a spiral segment arranged adjacent to one another in the circumferential direction. In an embodiment of this kind, the radially movable retaining claws can all be executed identically and on assembly of the mounting unit attention no longer has to be paid to ensuring that each retaining claw is mounted at a location suitable only for this retaining claw.

The several motion links in the shape of a spiral segment can also overlap in the circumferential direction, so that seen in a radial direction, several motion links in the shape of a spiral segment are arranged adjacent to one another on each section of the actuating disc associated with a radially movable retaining claw. In an embodiment of this kind, the retaining arm of one or each radially movable retaining claw can then be provided with several link blocks arranged radially adjacent to one another for engaging the several motion links.

The or each link block can have the form of a pin or bolt. Alternatively, the or each link block can have the form of a short rib in the shape of a spiral segment, wherein the dimensioning and shape of the rib in the shape of a spiral segment are selected such that it can interact with an associated motion link in the shape of a spiral segment. Link blocks with other shapes are likewise conceivable; it is merely important that the rotary movement of the actuating disc is transmitted in as loss-free a manner as possible by the motion link to the link block.

The or each motion link can have a slot-like opening of the actuating disc in the shape of a spiral segment. Alternatively, the or each motion link can be formed respectively by a motion link rib in the shape of a spiral segment that is or are formed on the actuating disc.

It was already explained that each retaining claw of the mounting unit is used to fit the mounting unit on the rim of the vehicle wheel and fasten it securely. In preferred embodiments of the inventive emergency wheel attachment, each retaining claw has a contact portion for contacting the rim flange and is further provided with at least one security portion, which is arranged next to the contact portion in the circumferential direction and in the operating state of the emergency wheel attachment, i.e. in the correctly fitted state of the emergency wheel attachment on a rim of a vehicle wheel, has a small radial spacing from the rim flange. This spacing should be in the range of 0.2 to 0.5 mm and is preferably in the order of 0.3 mm. The or each security portion of the retaining claw is arranged adjacent the contact portion in the circumferential direction of the mounting unit and is spaced from it by a slot. If the contact portion is a central contact portion, then a security portion is preferably arranged respectively on both sides of the central contact portion of the retaining claw. If overloading of the contact portion of a retaining claw occurs in operation of the emergency wheel attachment and resulting from this a failure of the contact portion occurs, for example due to the contact portion breaking off from the retaining claw, the security portion or security portions of the retaining claw in question then ensure that this retaining claw does not become detached from the rim. The play present between each security portion and the rim flange ensures on the one hand that in the event of an overload of the contact portion, the security portion or security portions of the retaining claw in question are not likewise overloaded, and ensures on the other hand that following a failure of the contact portion resting originally play-free on the rim flange, rattling caused by the play between rim flange and security portion occurs, which draws the driver's attention to the fact that something is out of order with the emergency wheel attachment.

For better force distribution and to increase attachment reliability, some or all retaining claws can be executed as double claws. A double claw has two retaining claw elements which are spaced at a distance from one another in the circumferential direction, wherein both retaining claw elements are attached to a common retaining arm. Each retaining claw element of a double claw can have in this case, as previously described, a contact portion and at least one security portion arranged adjacent thereto in the circumferential direction.

To ensure that each retaining claw element comes to fit correctly with the rim flange of a vehicle wheel when a double claw is braced radially, at least one of the retaining claw elements can be adapted to be able to rotate to a small extent relative to the common retaining arm about an axis that runs perpendicular to a plane spanned by the common retaining arm. In this way any angular errors arising can be compensated for and tilting of a retaining claw element is prevented.

To make it easier to insert the retaining claws into a region between the rim flange and the tire when fitting the mounting unit on the vehicle wheel, each retaining claw in preferred embodiments of the inventive emergency wheel attachment is provided with one or more recesses, which are located on its side facing the tire and are arranged in the region of an end portion of the retaining claw that is adjacent the free end of the retaining claw or comprises the free end. When the retaining claw is mounted, these recesses permit the rubber material of the tire to press into the recesses and thereby reduce the force exerted on the retaining claw by the tire on insertion of the retaining claw into said region.

So that a user can easily determine whether an inventive emergency wheel attachment was correctly mounted on a vehicle wheel, each retaining claw is preferably equipped with a radially extending stop surface, with which it rests on an outside of the rim, for example on the rim flange, in the operating state of the emergency wheel attachment. Furthermore, at least one and preferably every retaining claw is provided with an indicator element, which is elastically pretensioned in the direction of the rim and passes through the retaining claw in the region of the radially extending stop surface, wherein an end of the indicator element facing the rim is intended to contact the rim and an opposite other end of the indicator element displays correct fitting of the mounting unit in the operating state of the emergency wheel attachment. For example, when the mounting unit is fitted correctly, an end of the indicator element that is marked in colour protrudes on the side of the emergency wheel attachment facing away from the vehicle wheel and thereby indicates that the mounting unit has been mounted correctly. Alternatively this end of the indicator element can also end flush with a surrounding surface of the emergency wheel attachment when the mounting unit is mounted correctly. The or each indicator element can also be configured differently provided that it is able to display that the radially extending stop surface rests correctly on the outside of the rim.

For a space-saving and easy-to-fit design of the inventive emergency wheel attachment, the tread unit in preferred embodiments is a unit separate from the mounting unit and preferably consisting of several annular segments, which is configured for connection to the mounting unit and is connected to the mounting unit in the operating state of the emergency wheel attachment. According to one exemplary embodiment, the tread unit is a unit consisting of two semi-circular ring segments. In an alternative embodiment, the tread unit consists of two circular ring segments, of which one occupies roughly two thirds of the circumference and the other circular ring segment occupies a third of the circumference. Other configurations are also conceivable, for example a division of the tread unit into three or more circular ring segments.

To connect the tread unit to the mounting unit, locating bolts are used in some embodiments, which are arranged projecting on the side of the mounting unit facing away from the vehicle wheel. After the mounting unit has been attached to the vehicle wheel, the tread unit can be pushed onto the locating bolts projecting from the mounting unit and attached to them. The locating bolts can be attached to a housing of the mounting unit. Alternatively or in addition, the locating bolts can be attached to the retaining claws, in particular to the radially inwards extending retaining arm of each retaining claw. If a locating bolt is attached to the retaining claw, the locating bolt can serve at the same time as a link block in that it projects e.g. through a motion link of the actuating disc that is designed as a slot-like opening in the shape of a spiral segment. According to one embodiment, the locating bolts are threaded bolts that permit the tread unit to be attached to the mounting unit by nuts with which the tread unit is screwed tightly on the mounting unit.

The aforesaid nuts can be cap nuts and contained in each cap nut can be an optical and/or acoustic indication device, which signals a correct mounting state. For example, a snapping noise produced by means of a bistable metal plate can signal that a torque required for the correct attachment of the tread unit to the mounting unit has been attained. Alternatively or in addition, a pin jumping outwards out of the cap nut or a pin ending flush with the outer surface of the cap nut can signal that the cap nut has been correctly tightened.

In modified embodiments of the inventive emergency wheel attachment, latching devices serve to connect the tread unit to the mounting unit, wherein the latching devices are arranged on the side of the emergency wheel attachment facing away from the vehicle wheel. According to one embodiment, each latching device can comprise a radially movable slider arranged on the mounting unit, which slider is elastically pretensioned radially outwards, wherein the slider has a ramp, which comes into contact with an associated face of the tread unit when the tread unit is fitted, so that the slider is displaced radially inwards in the mounting process and moves, due to its elastic pretensioning, radially outwards again and over the surface of the tread unit when mounting of the tread unit is complete and thereby locks the tread unit in the correctly fitted position. Modified implementations of the latching device are likewise conceivable. All latching devices have the advantage, however, that the tread unit only needs to be pushed onto the mounting unit already attached to the vehicle wheel for connection to the mounting unit and then latches automatically. Screwing of the tread unit onto the mounting unit is thus no longer necessary. In embodiments of this kind with automatic latching of the tread unit, the design of the mounting unit does not necessarily have to be substantially annular, but differently designed mounting units can also be used, for example those in which several attachment arms extend radially outwards from a center of the mounting unit, at the free end of which arms at least one retaining claw is located in each case.

Specifically in embodiments of the inventive emergency wheel attachment that have relatively few retaining claws, at least one self-bracing security claw for engaging behind the rim flange of the rim can be provided to increase attachment reliability. The or each self-bracing security claw is arranged on the side of the tread unit facing the vehicle wheel, wherein each security claw is preferably arranged, seen in the circumferential direction of the emergency wheel attachment, between two retaining claws respectively. One exemplary embodiment can have three retaining claws and three self-bracing security claws. Such self-bracing security claws can of course also be provided on embodiments of the emergency wheel attachment that have more than just relatively few retaining claws.

Each security claw preferably has an actuating slider, one end of which passes through a tread of the tread unit and protrudes radially from the tread. When the tread rolls in operation of the emergency wheel attachment, the end of the actuating slider protruding radially from the tread is pressed radially inwards by contact with the road surface, whereby the other, radially inner end of the actuating slider moves radially inwards and, by coming into contact with the security claw, presses the security claw onto and behind the rim flange of the rim.

In preferred embodiments, the or each actuating slider is elastically pretensioned radially outwards and has a locking device that prevents the actuating slider from moving radially outwards following a displacement of the actuating slider taking place radially inwards. The locking device thus ensures that the security claw pressed by means of the actuating slider onto and behind the rim flange of the rim retains this position. Lamellae of spring steel, for example, can be used as a locking device, the free end of which lamellae interacts with latching teeth present on the actuating slider. Other locking devices for preventing a movement of the actuating slider directed radially outwards following actuation are conceivable.

The embodiments of the emergency wheel attachment described above with at least one self-bracing security claw are not dependent on the configuration of the mounting unit being substantially annular. On the contrary, differently configured mounting units can also be used, for example those in which several attachment arms extend radially outwards from a center of the mounting unit, at the free end of which arms at least one retaining claw is located in each case.

In the embodiments described previously with one or more security claws, the actuating slider that is elastically pretensioned radially outwards and protrudes radially from the tread of the emergency wheel attachment is used for the displacement radially inwards of an associated security claw and is described as an actuating slider for this reason. A slider constructed and arranged in this way can also be used, however, to secure a radially movable retaining claw, which has been brought into engagement with the rim flange by means of the described mounting unit of the inventive emergency wheel attachment, against unintentional loosening or detachment. To this end, such a slider, which is elastically pretensioned radially outwards and passes through the tread of the emergency wheel attachment, is arranged in a region of the emergency wheel attachment that is located radially outside of a radially movable retaining claw. In operation of the emergency wheel attachment, this slider initially protruding radially from the tread is then pressed radially inwards by contact with the road surface and the radially inner end of the slider is designed so that it presses from radially outside onto the retaining claw, more precisely onto a retaining claw head of the retaining claw. Since the slider is prevented by the locking device already described above from moving radially outwards again following a displacement radially inwards, this resting of the radially inner end of the slider on the retaining claw head leads to the retaining claw head maintaining its position and not being able to become loose or detached. A slider of this kind thus constitutes a retaining claw securing device.

It should have become evident from the previous description of the inventive emergency wheel attachment that by suitable rotation of the drive device, the or each movable retaining claw moves radially inwards and the mounting unit is braced thereby on the rim of the vehicle wheel. To avoid too high a torque being exerted when bracing the mounting unit on the rim of the vehicle wheel, which could lead to undesirable deformation of the rim flange, for example, preferred embodiments of the emergency wheel attachment are equipped with a torque-limiting device for the drive device. If the drive device is a drive pinion that is coupled or can be coupled to the actuating element, this drive pinion can then be connected to a cap nut in which such a torque-limiting device is located. The torque-limiting device can be a slipping clutch consisting of several spring washers arranged above one another, for example. The spring washers can have elevations and recesses that are executed corresponding to one another, so that once a predetermined torque has been exceeded, the torque-limiting device continues to rotate in sections without the torque applied to the actuating element being increased thereby, however.

To protect and also to guide and/or carry the annular actuating element, the mounting unit preferably has an at least substantially annular housing in which the actuating element is arranged. To make it easier to apply the mounting unit to the vehicle wheel, a handle spanning the free center of the housing of the mounting unit is attached to the housing in preferred embodiments, wherein the handle is preferably curved convexly outwards so as to be able to be gripped better.

Figure 3:
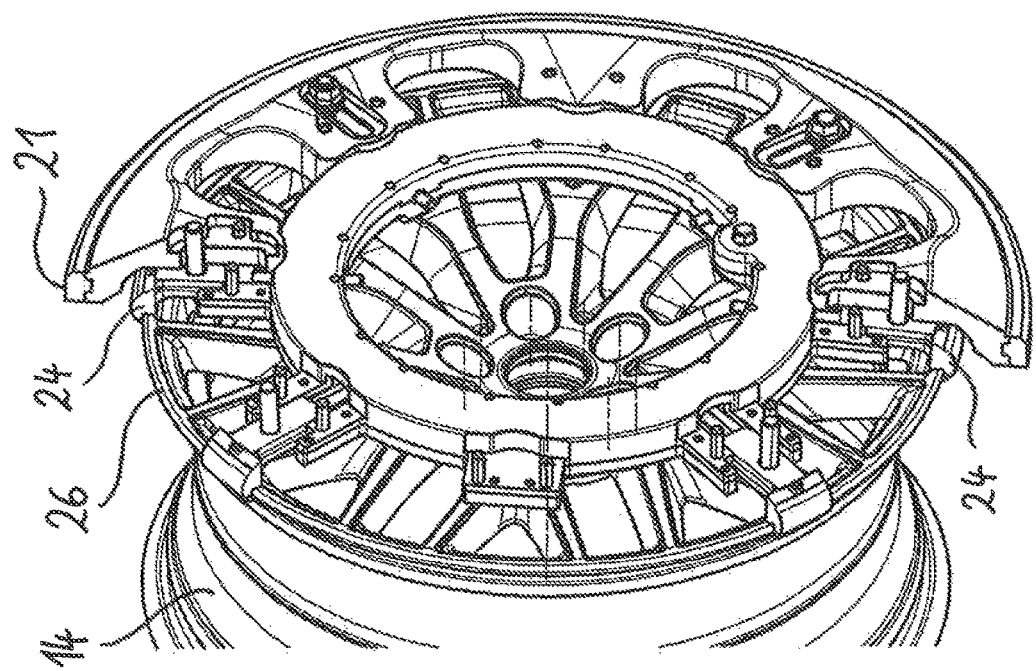
Figure 2:
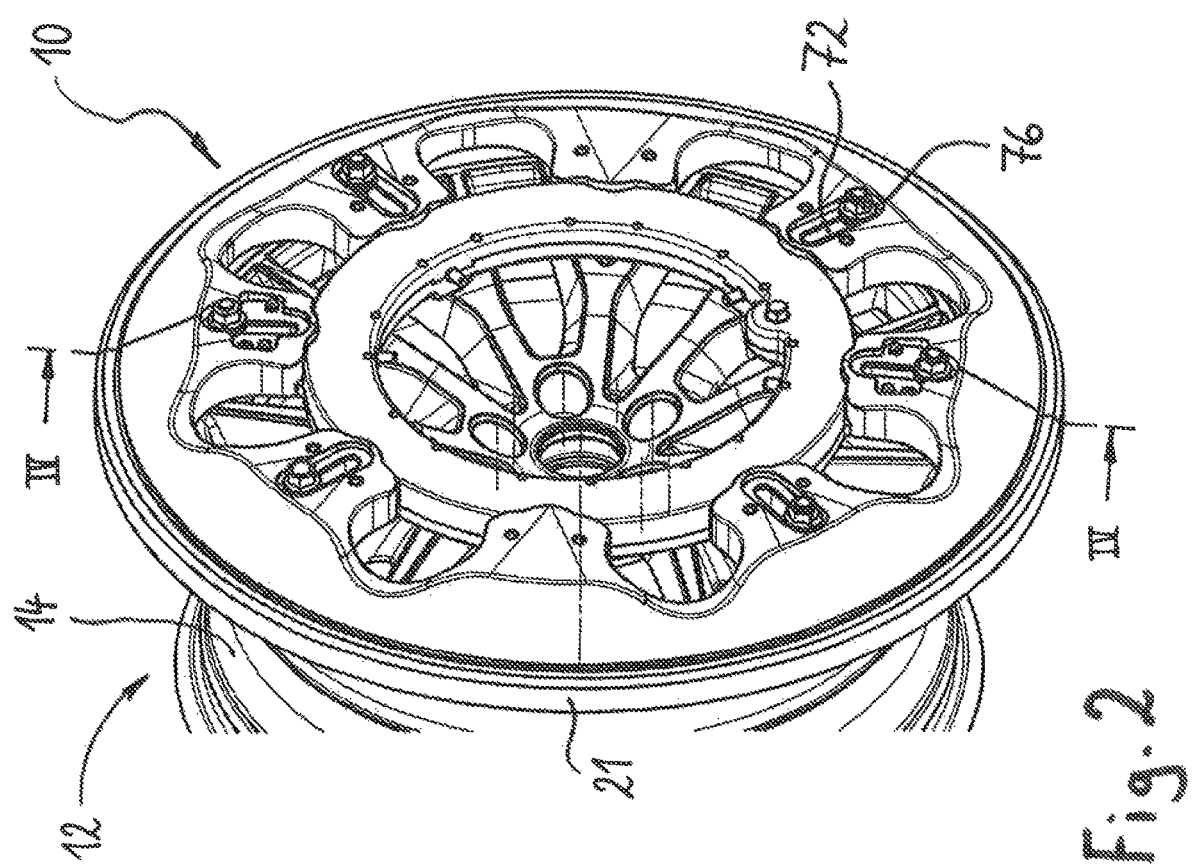
Figure 5:
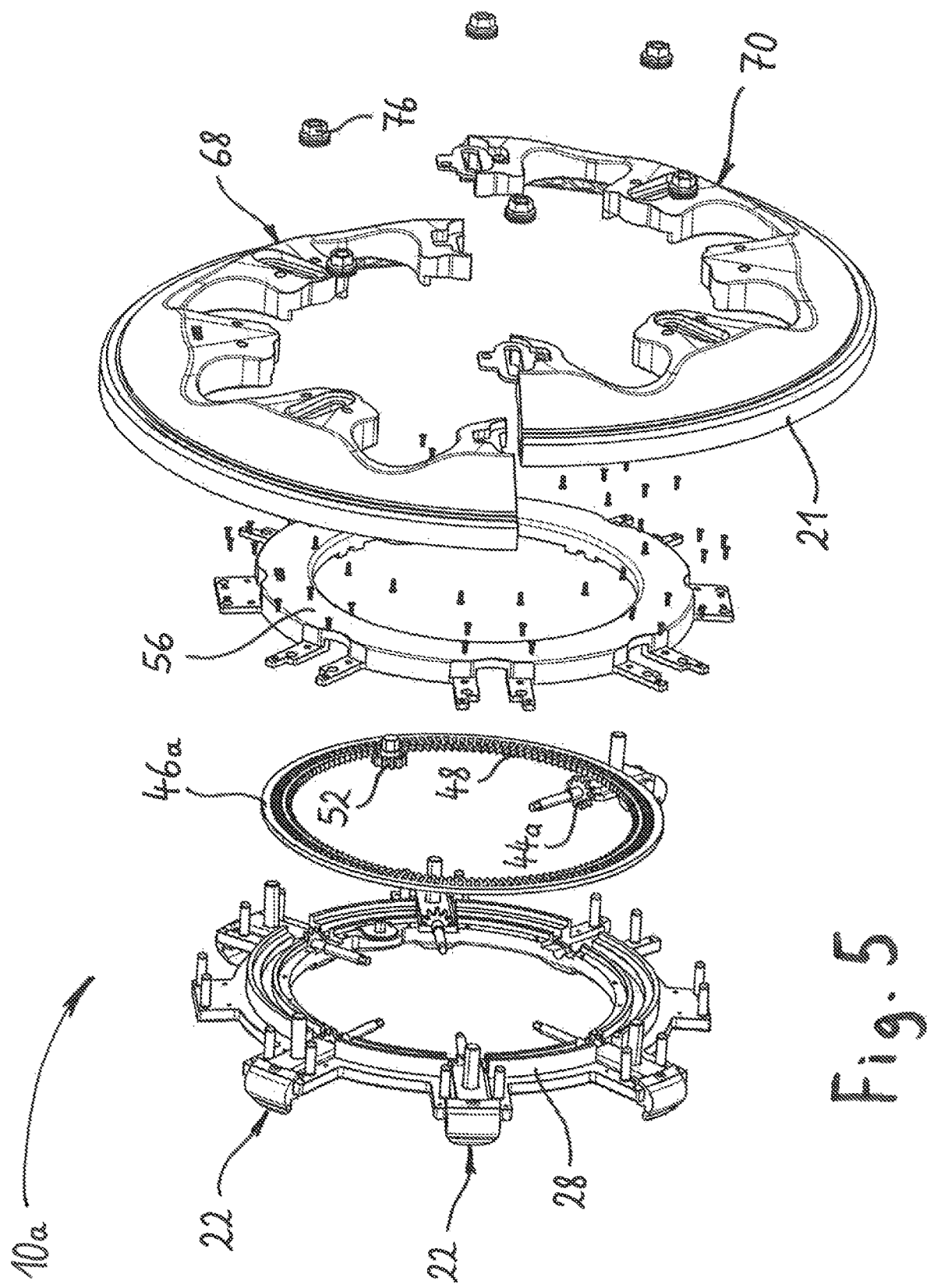
Figure 6:
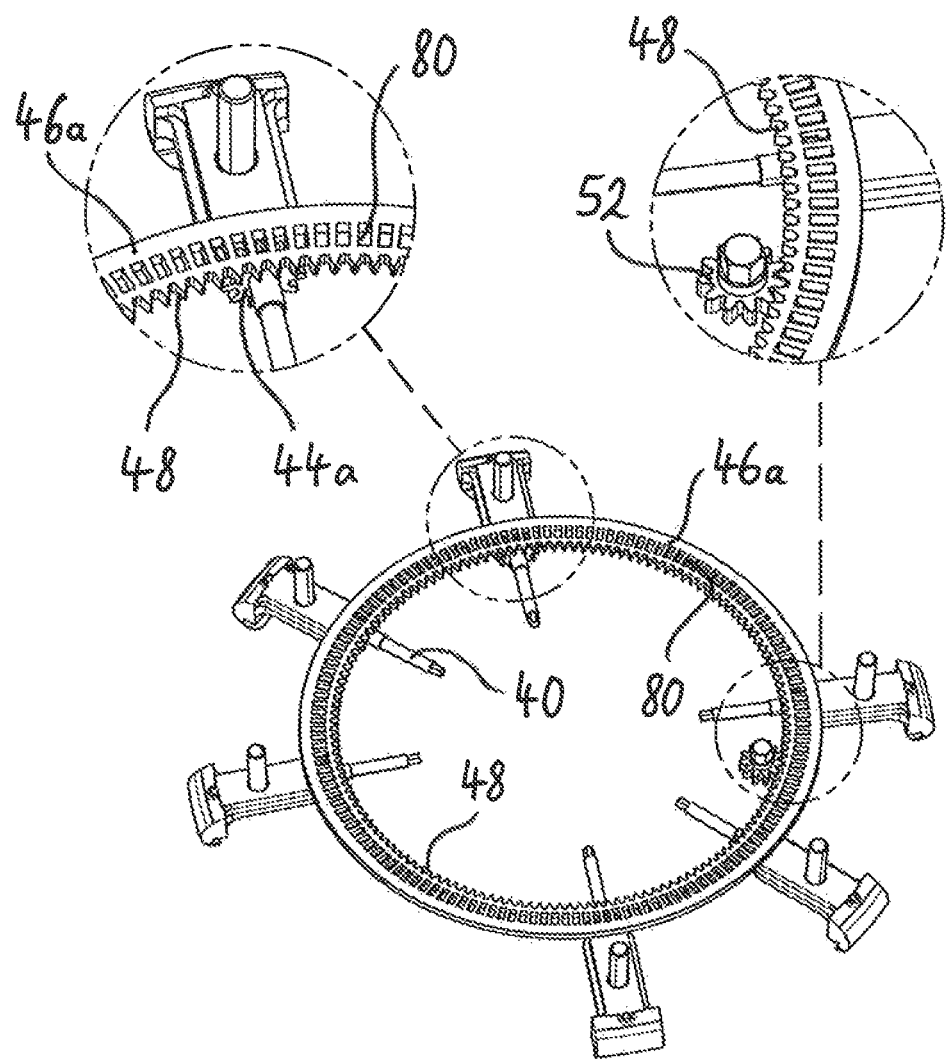
Figure 10:
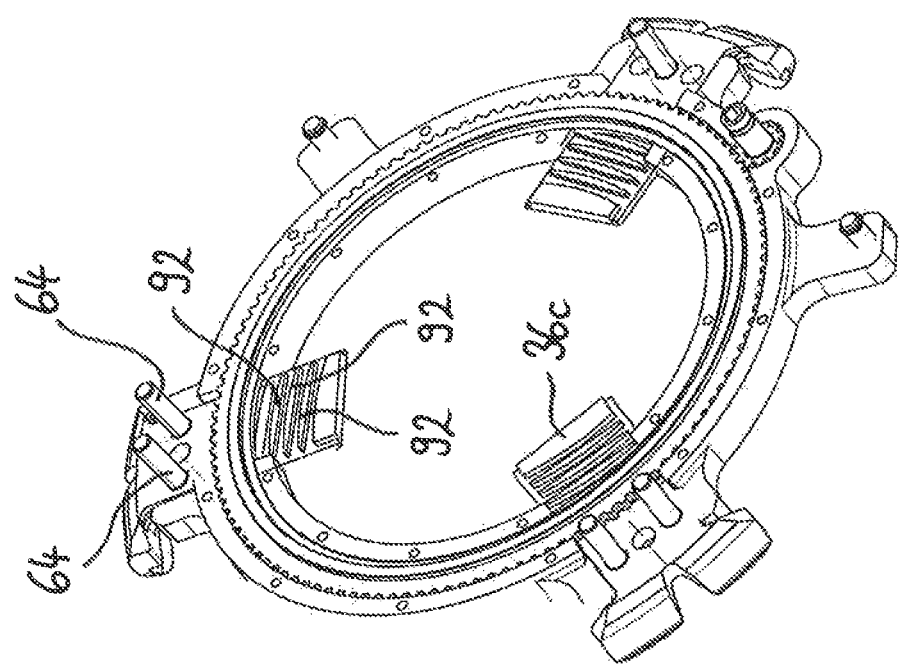
Figure 9:
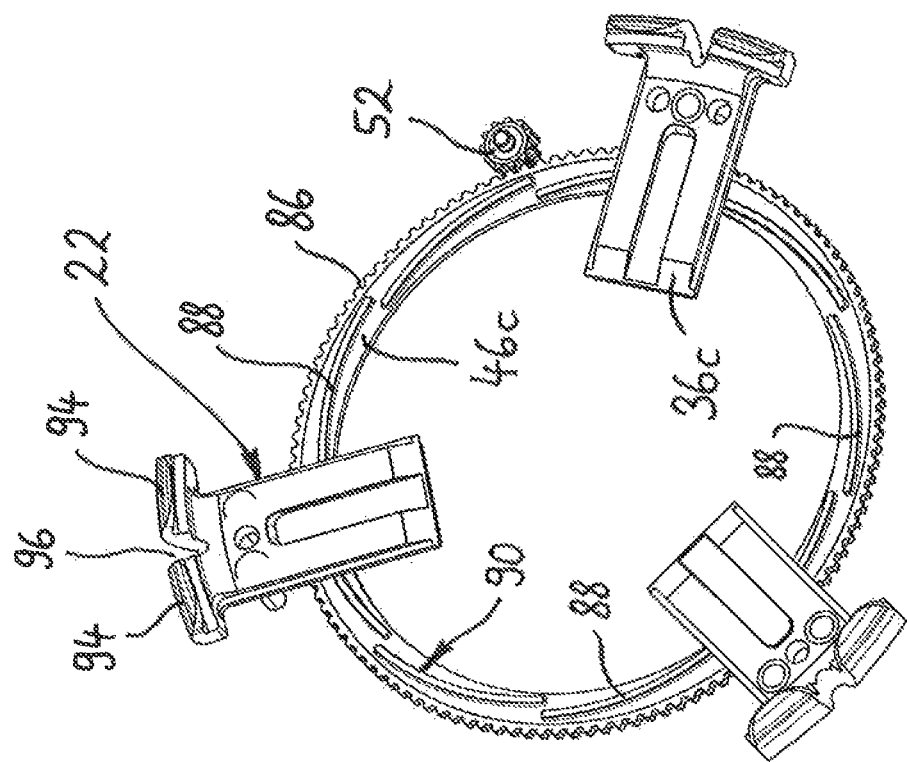
Figure 12:
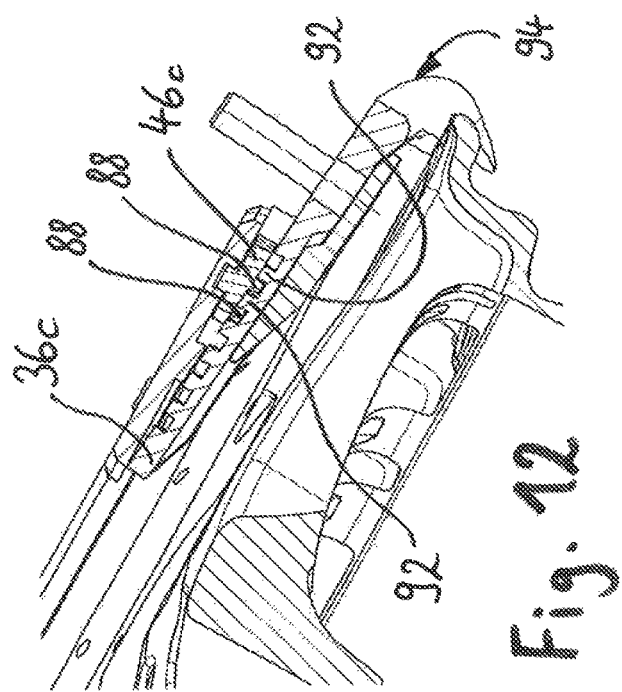
Figure 11:
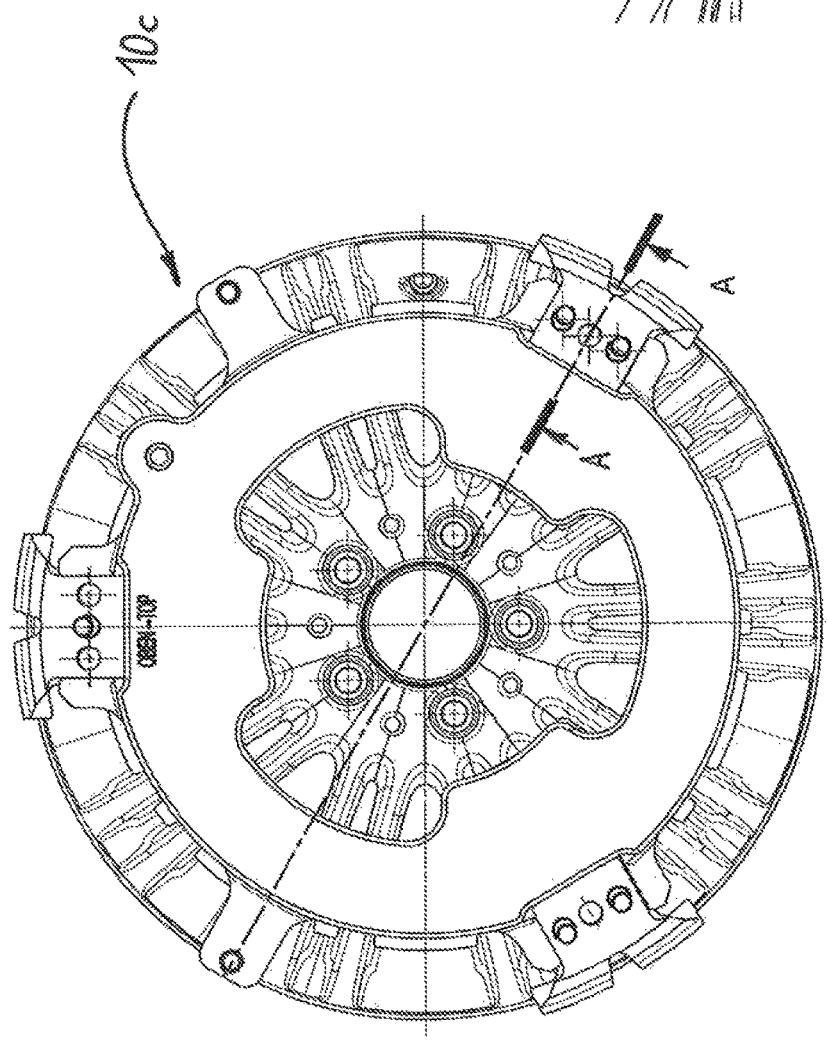
Figure 13:
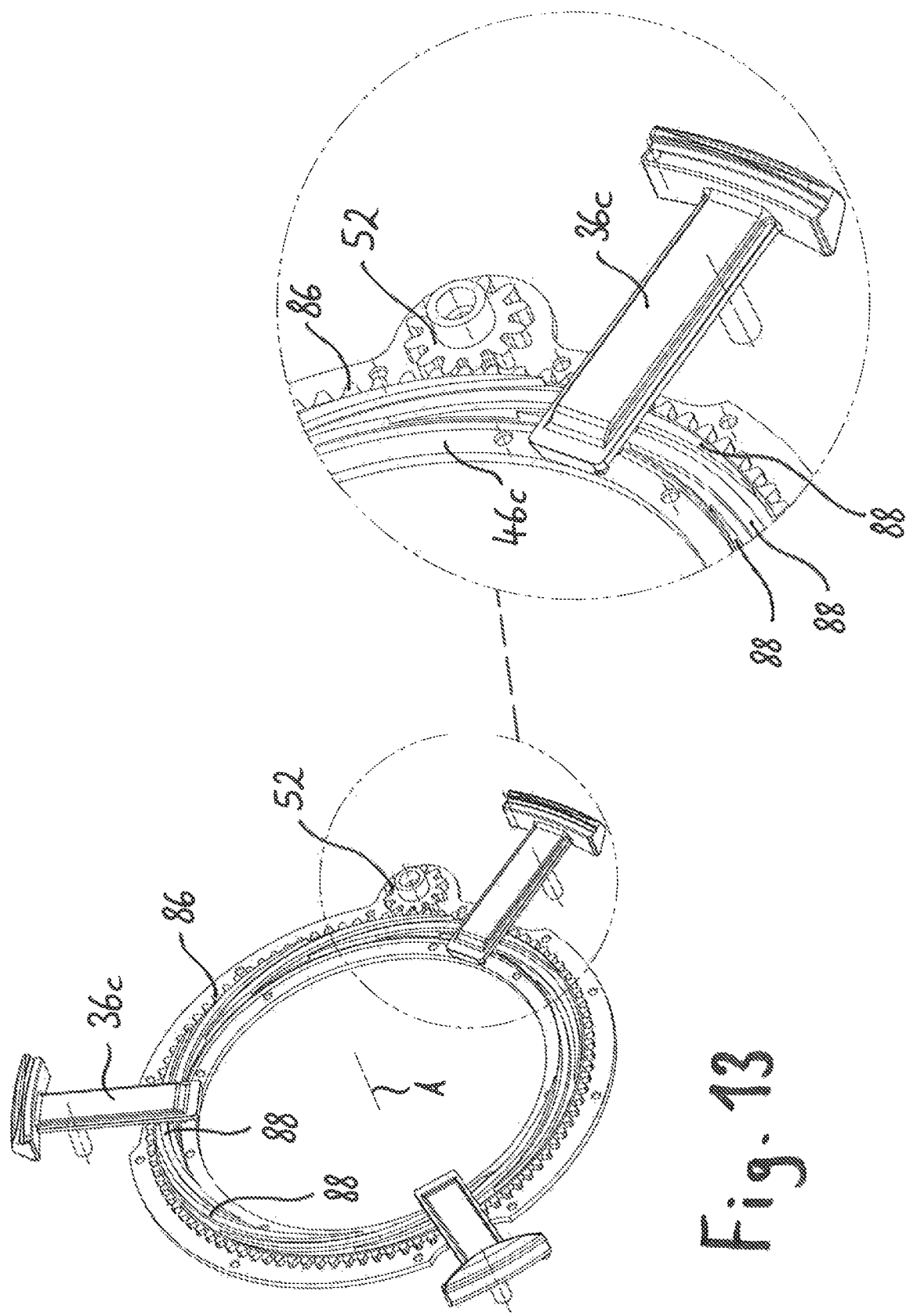
Figure 14:
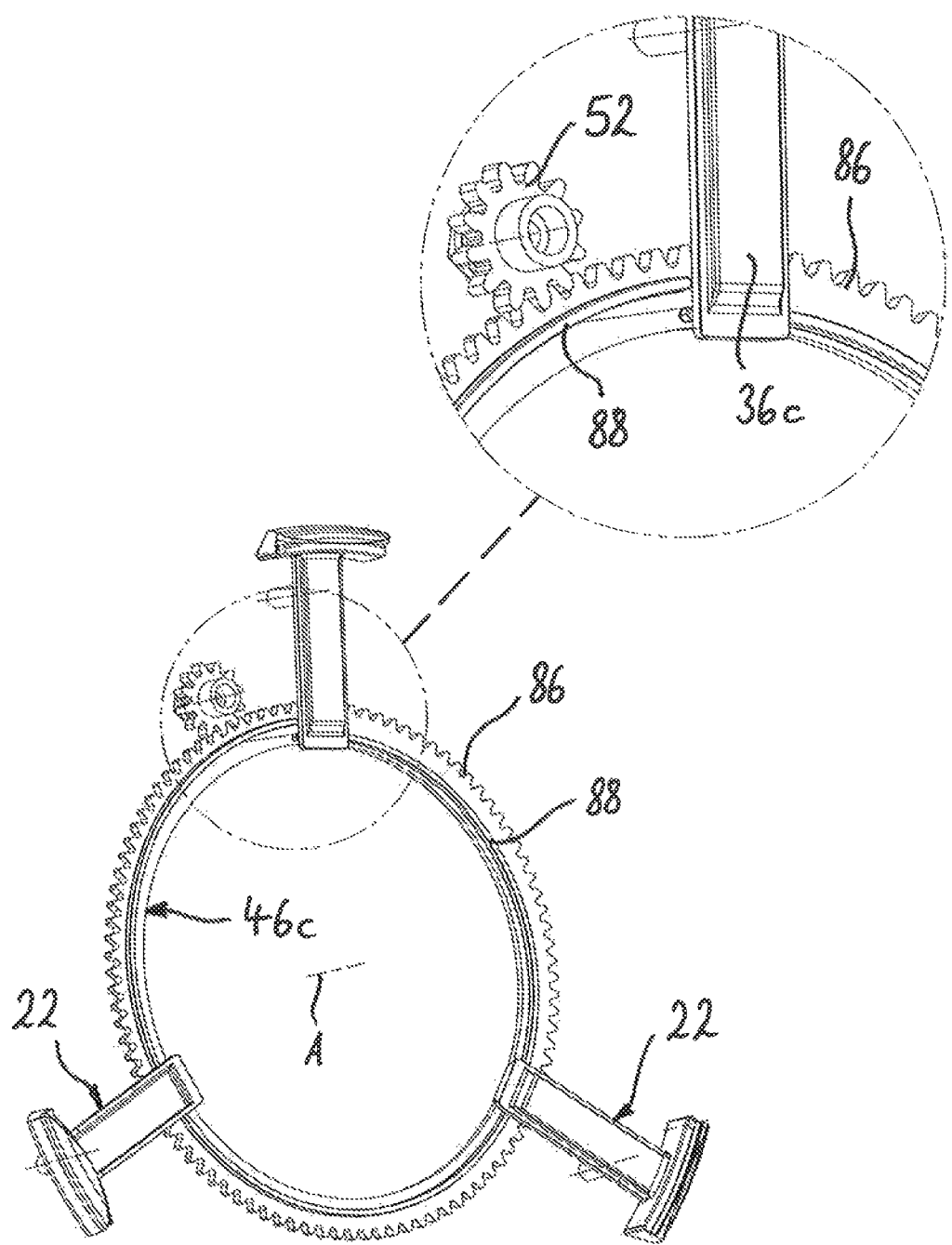
Figure 15:
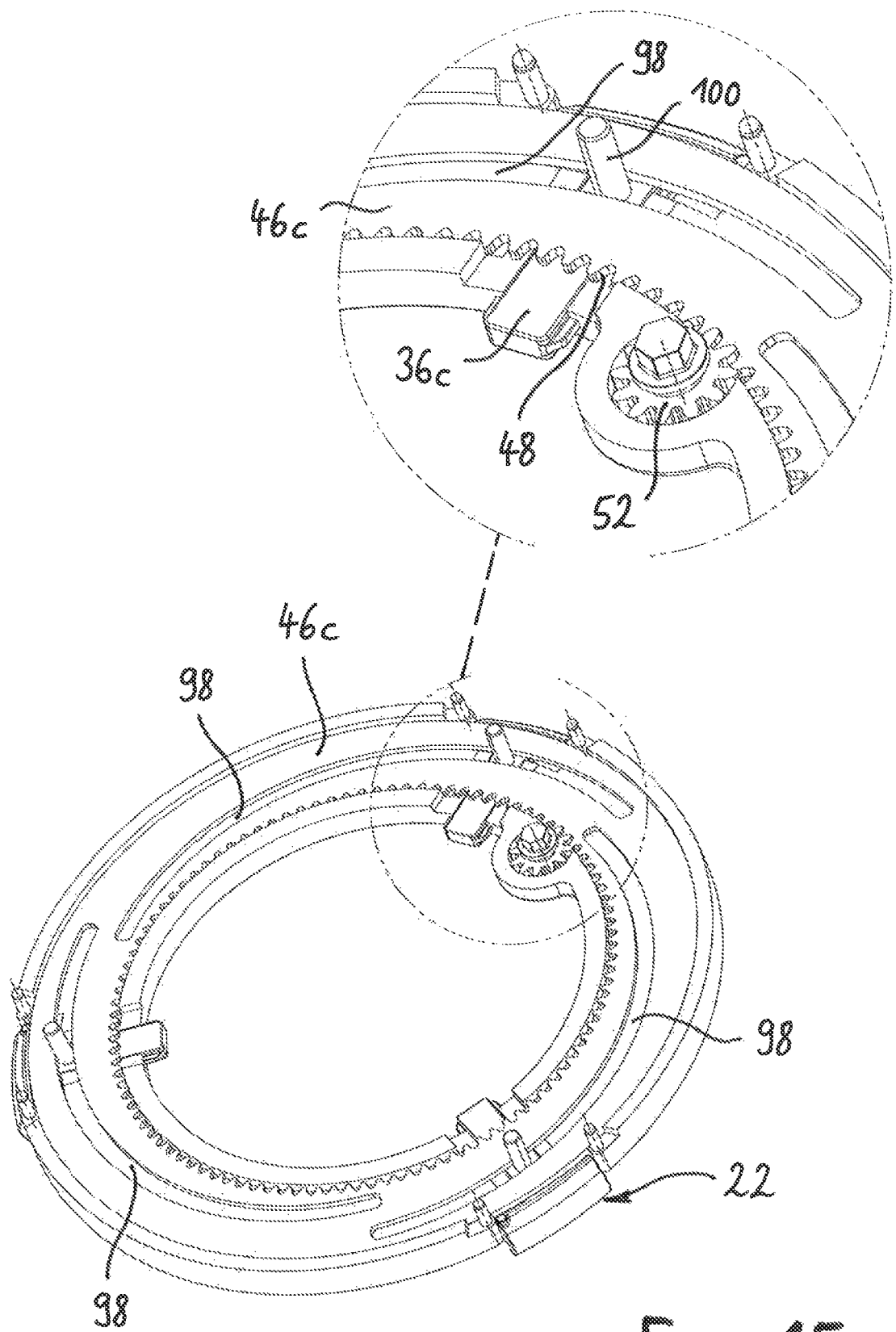
Figure 18:
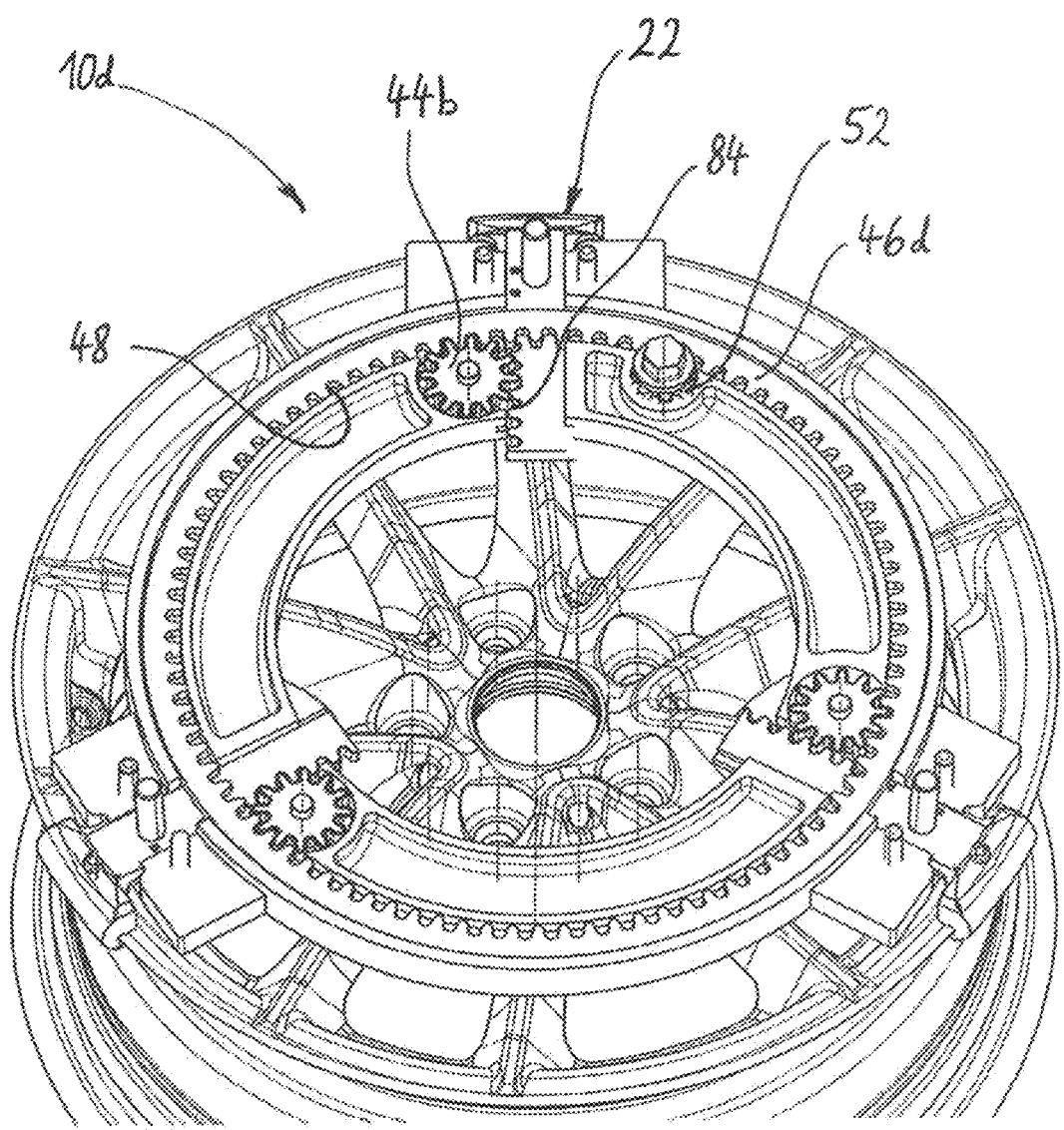
Figure 19:
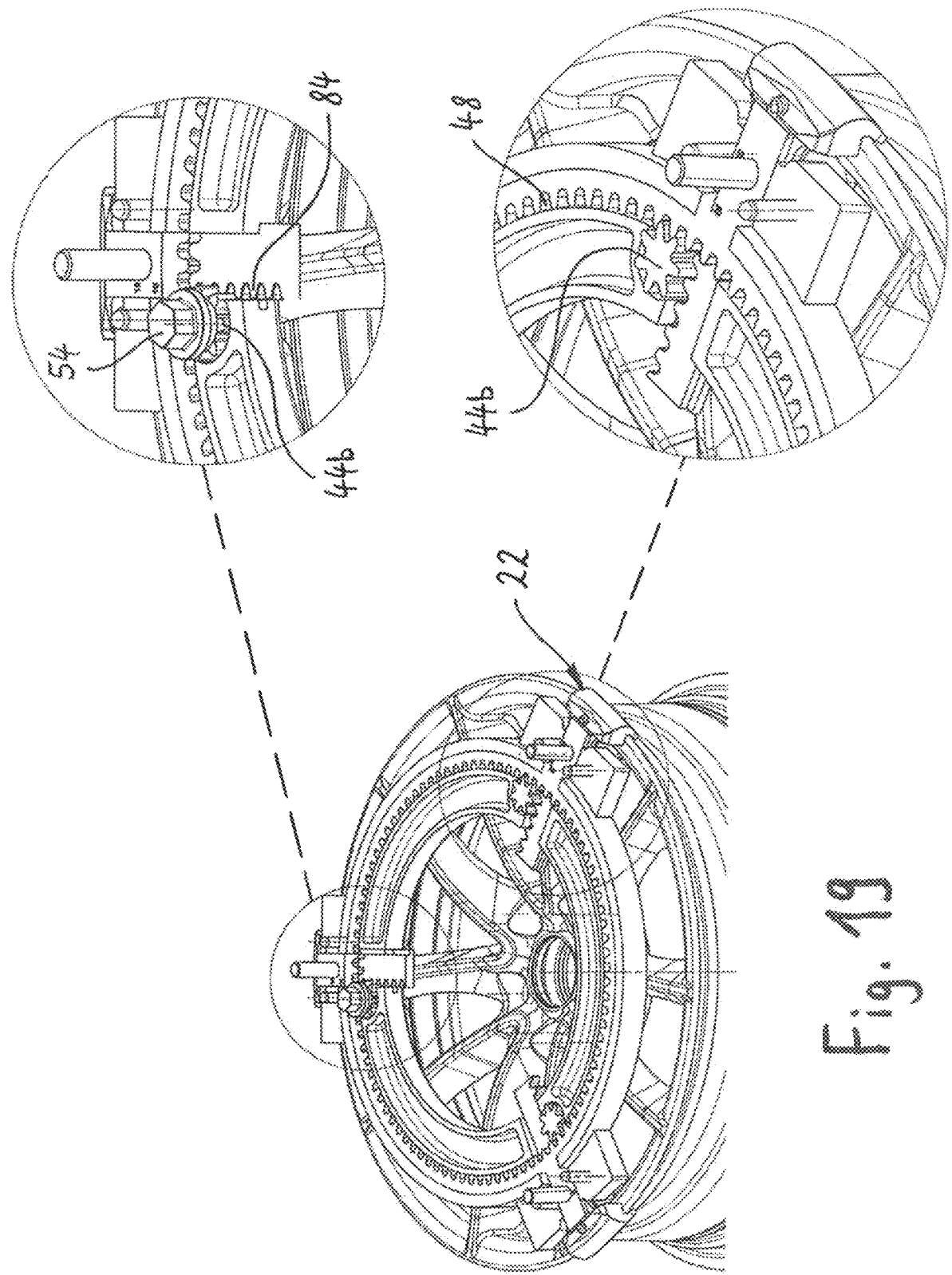
Figure 20:
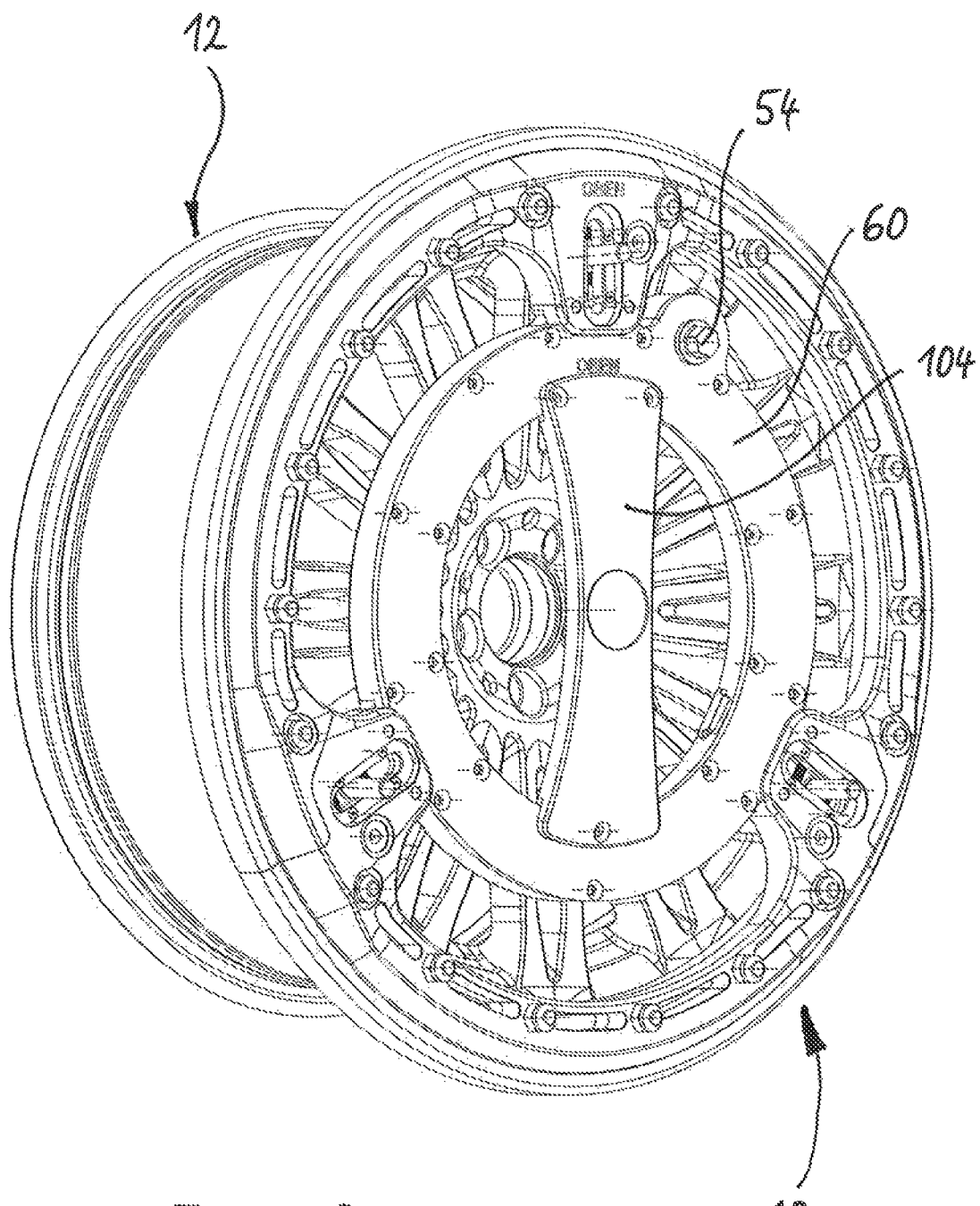
Figure 22:
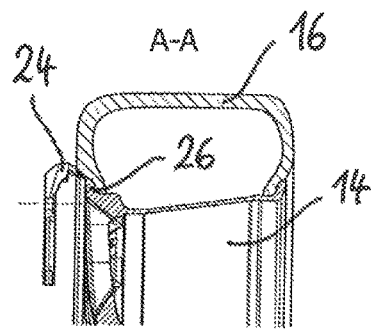
Figure 21:
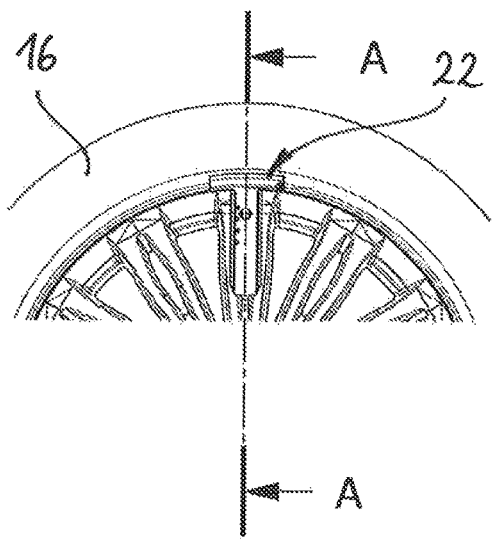
Figure 23:
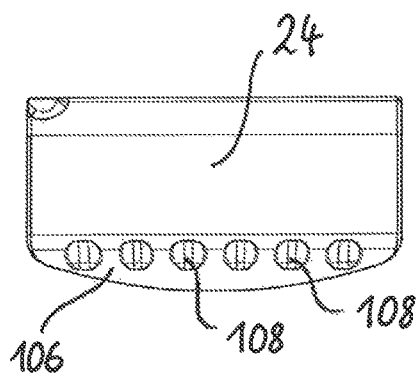
Figure 24:
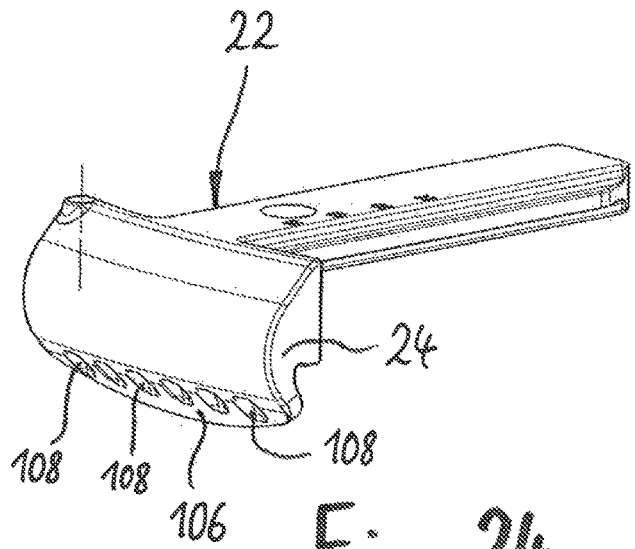
Figure 25:
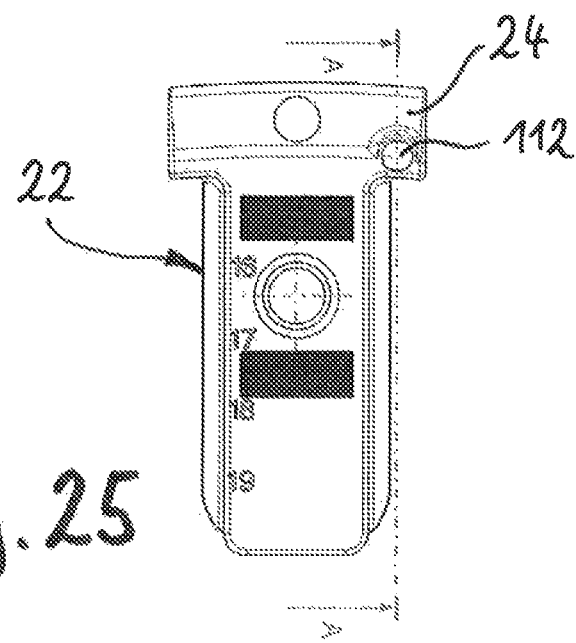
Figure 26:
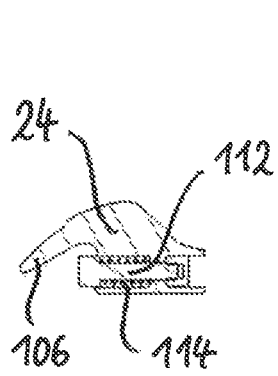
Figure 27:
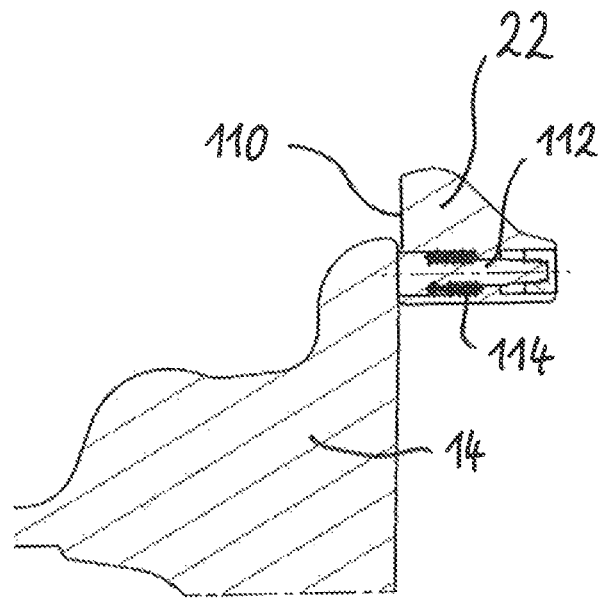
Figure 28:
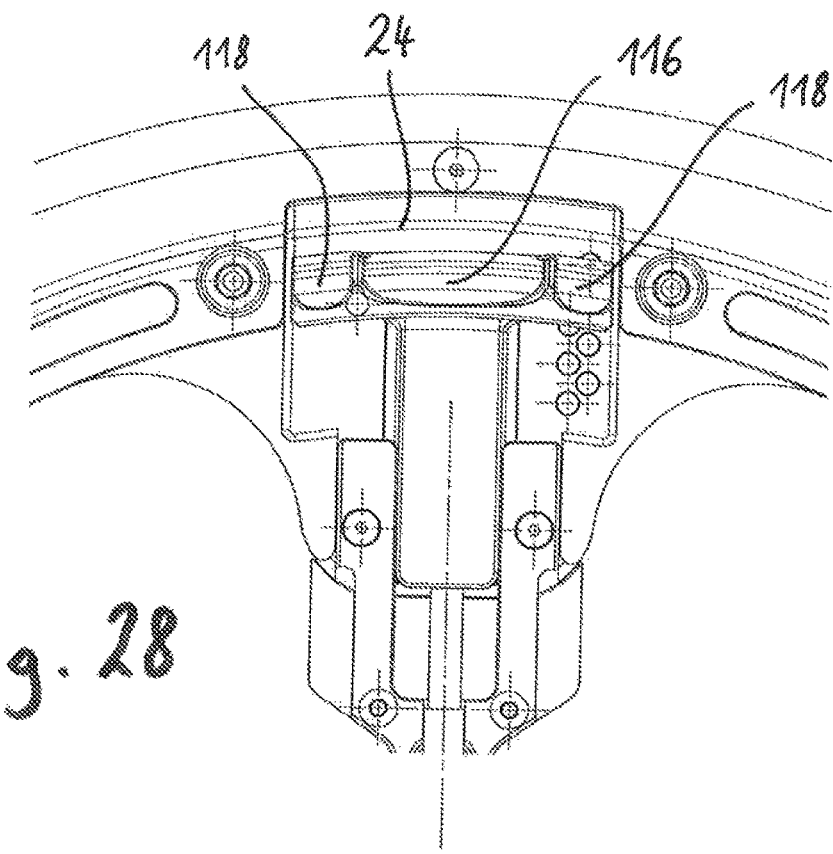
Figure 29:
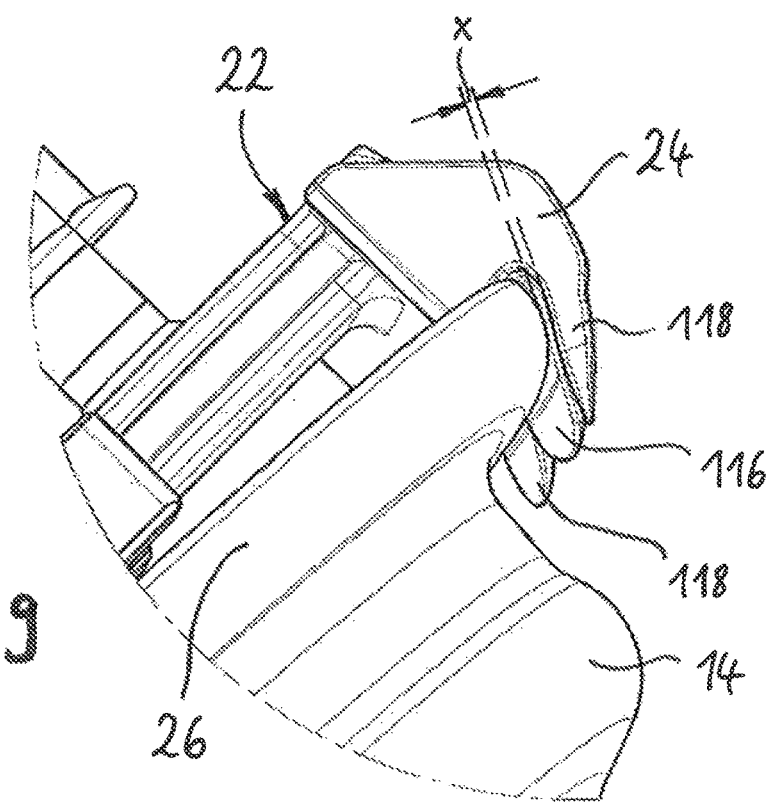
Figure 30:
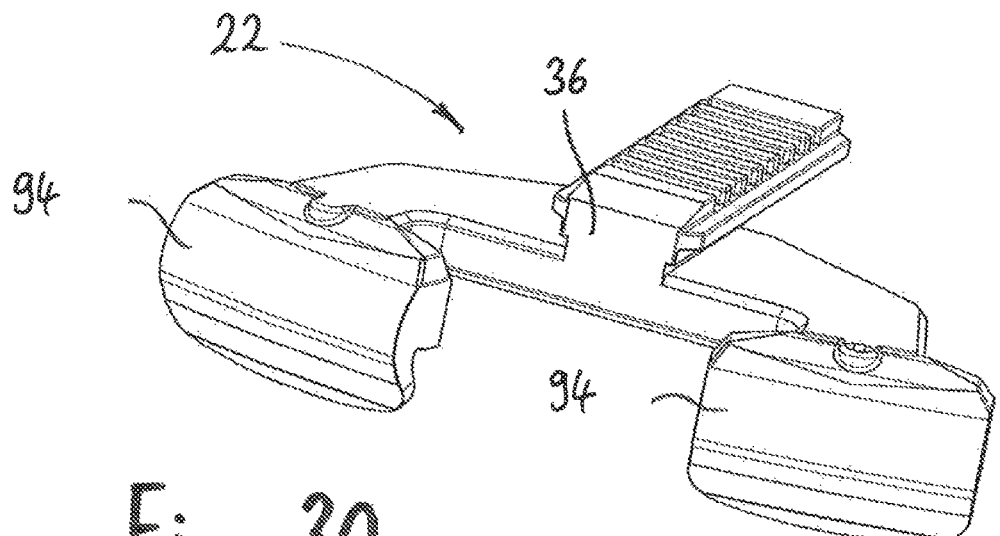
Figure 31:
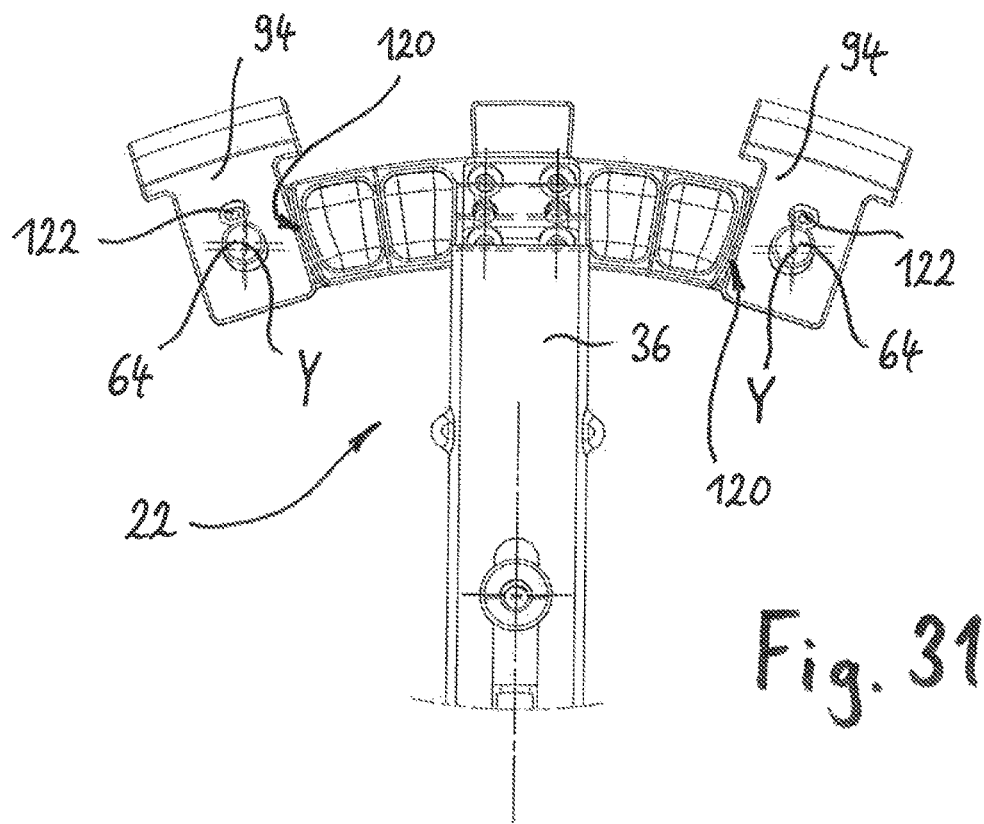
Figure 34:
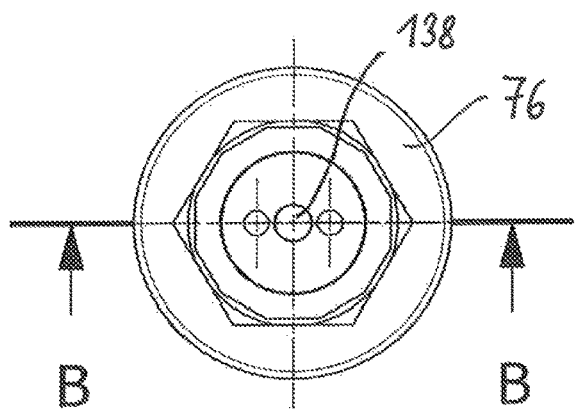
Figures 35, 36:
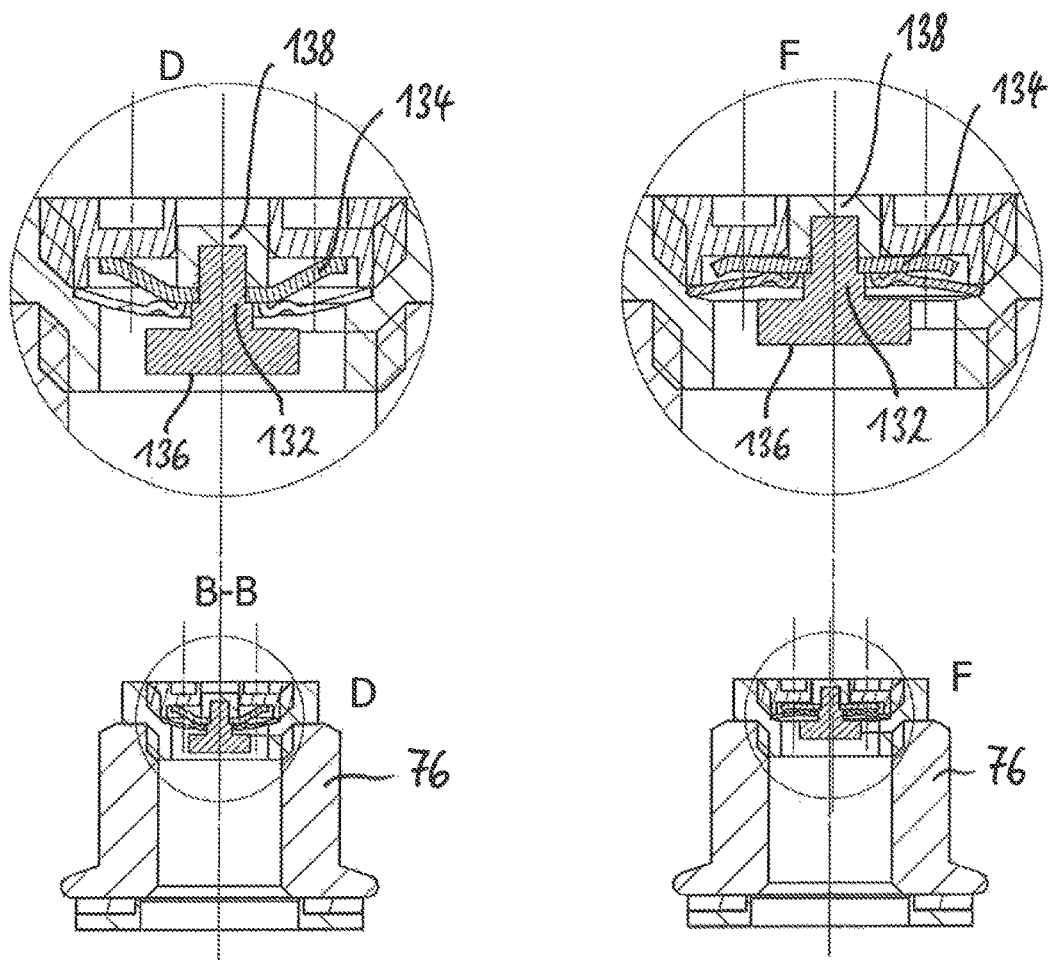
Figure 39:
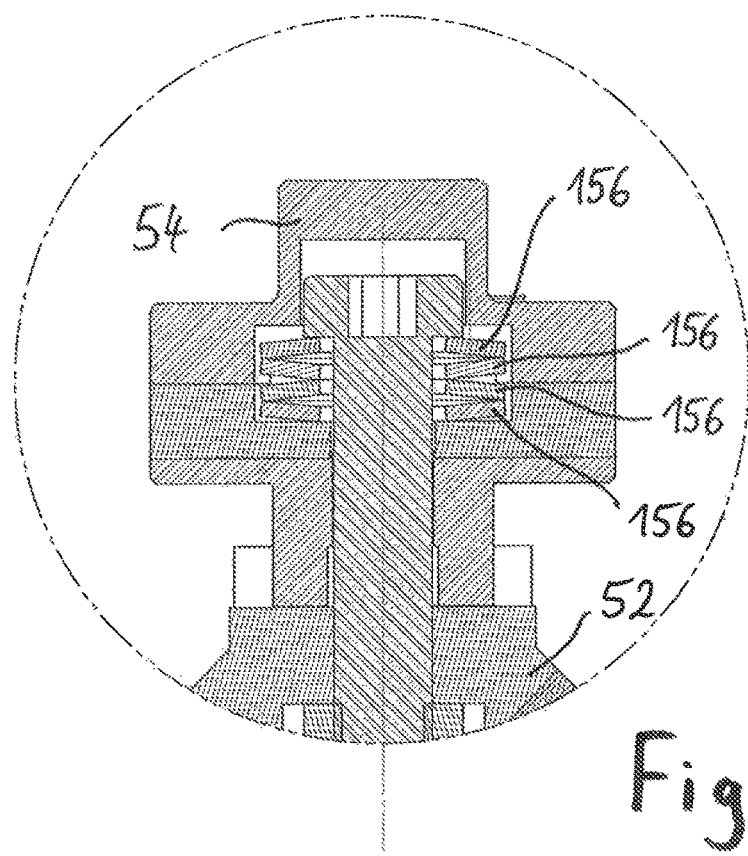
Figure 40:
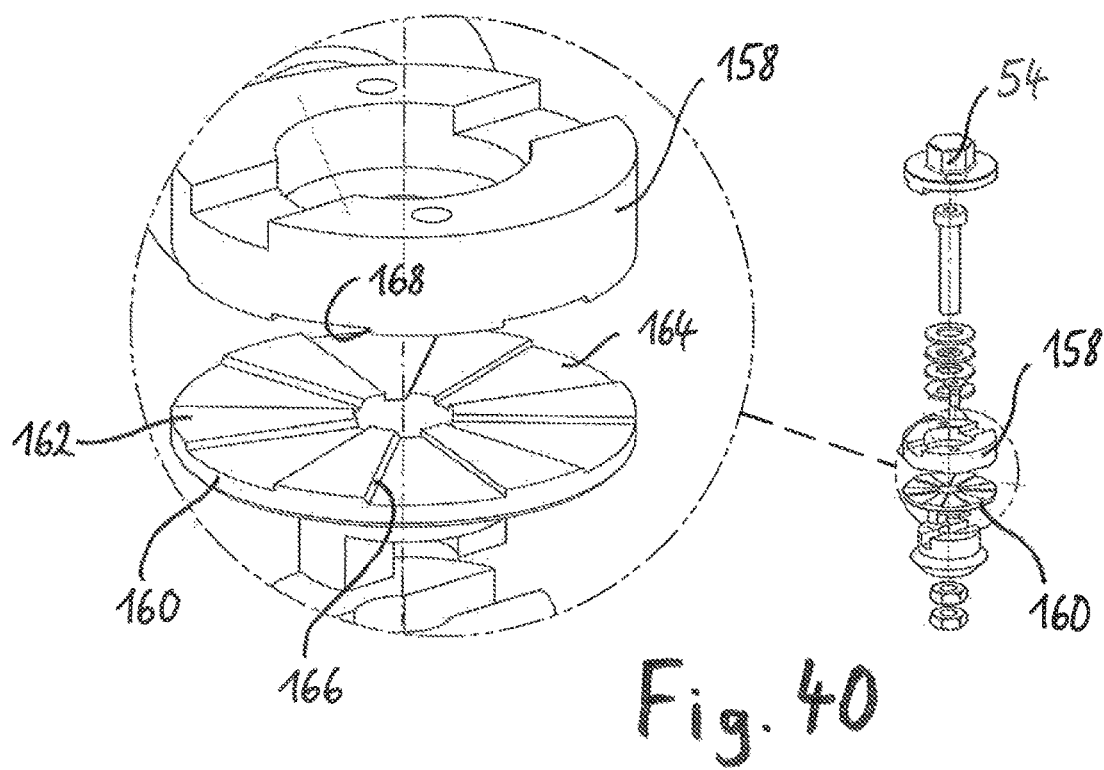

Several exemplary embodiments of an inventive emergency wheel attachment are explained in greater detail below together with other implementation details on the basis of the schematic drawings enclosed. The figures show:

FIG. 1 an exploded representation of a first embodiment of an inventive emergency wheel attachment for a vehicle wheel, FIG. 2 the emergency wheel attachment from FIG. 1 in a state mounted to a vehicle wheel, FIG. 3 the view from FIG. 2 with partly dismantled tread unit, FIG. 4 a cross section of the emergency wheel attachment from FIG. 2 attached to a vehicle wheel with an enlarged detailed representation of the region of a retaining claw, FIG. 5 an exploded representation of a second embodiment of an inventive emergency wheel attachment, FIG. 6 detailed representations of the cooperation between an actuating disc and retaining claws of the second embodiment from FIG. 5, FIG. 7 a spatial partial representation of a third embodiment of an inventive emergency wheel attachment, FIG. 8 a spatial partial representation of a modification of the third embodiment of the inventive emergency wheel attachment, FIG. 9 a spatial partial representation of a first exemplary embodiment of a fourth embodiment of an inventive emergency wheel attachment from obliquely above, FIG. 10 the partial representation from FIG. 9 from underneath, FIG. 11 a plan view of the first exemplary embodiment of the fourth embodiment in a state attached to a vehicle wheel, FIG. 12 section A-A from FIG. 1, FIG. 13 a spatial partial representation of a second exemplary embodiment of the fourth embodiment of an inventive emergency wheel attachment from obliquely above, FIG. 14 a spatial partial representation of a third exemplary embodiment of the fourth embodiment of an inventive emergency wheel attachment from obliquely above, FIG. 15 a spatial partial representation of a fourth exemplary embodiment of the fourth embodiment of an inventive emergency wheel attachment from obliquely above, FIG. 16 a spatial partial representation of a fifth exemplary embodiment of the fourth embodiment of an inventive emergency wheel attachment from obliquely above, FIG. 17 a detailed view of the fifth exemplary embodiment of the fourth embodiment with an actuating disc removed, FIG. 18 a spatial partial representation of a first exemplary embodiment of a fifth embodiment of an inventive emergency wheel attachment from obliquely above in a state attached to a vehicle wheel, FIG. 19 a second exemplary embodiment, slightly modified compared with FIG. 18, of the fifth embodiment, FIG. 20 a spatial view of an inventive emergency wheel attachment with a handle, FIG. 21 a plan view of a retaining claw, depicted in isolation, of an inventive emergency wheel attachment in a position initially assumed by the retaining claw when the emergency wheel attachment is attached to a vehicle wheel, FIG. 22 section A-A from FIG. 21, FIG. 23 a plan view of a modified retaining claw of an inventive emergency wheel attachment, FIG. 24 a spatial representation of the retaining claw from FIG. 23, FIG. 25 a plan view of a retaining claw of an inventive emergency wheel attachment with an indicator element, which indicates correct mounting, FIG. 26 section A-A from FIG. 25, FIG. 27 a section through the part of a retaining claw with the indicator element from FIG. 26 in a state correctly fitted on a vehicle wheel, FIG. 28 a view of a modified retaining claw of an inventive emergency wheel attachment, FIG. 29 a detailed view of the retaining claw from FIG. 28 in a state mounted on a vehicle wheel, FIG. 30 a spatial representation of a retaining claw implemented as a double claw, FIG. 31 a plan view of a modified embodiment of a double claw, FIG. 32 a spatial view in section of an embodiment of an inventive emergency wheel attachment with at least one additional security claw, FIG. 33 the view from FIG. 32 with security claw braced on the rim of the vehicle wheel, FIG. 34 a plan view of a cap nut for screwing a tread unit tightly to a mounting unit of an inventive emergency wheel attachment, FIG. 35 a cross section through the cap nut from FIG. 34 in the unscrewed state, FIG. 36 the cross-sectional representation from FIG. 35 in the firmly screwed-on state of the cap nut, FIG. 37 a spatial representation of a sixth embodiment of an inventive emergency wheel attachment with automatically latching tread unit from obliquely above, FIG. 38 section C-C from FIG. 37, FIG. 39 a cross section through a cap nut for a rotatable drive pinion of an inventive emergency wheel attachment, wherein the cap nut is provided with a torque-limiting device, and FIG. 40 an exploded representation of the cap nut from FIG. 39 with a modified torque-limiting device.

In FIGS. 1 to 4, a first embodiment of an emergency wheel attachment 10 for a vehicle wheel 12 is shown, which comprises a rim 14 and a tire 16 (only shown in FIGS. 21 and 22) arranged on the rim. In its operating state (see FIG. 2), the emergency wheel attachment 10 is placed onto the outside of the vehicle wheel 12 and attached to the rim 14 of the vehicle wheel 12 in order to enable continued driving in the event of tire damage. Although not shown in FIG. 2, the damaged tire 16 is normally also still located on the rim 14 in the operating state of the emergency wheel attachment 10 unless the tire 16 had already become fully detached from the rim 14. The functionality of the emergency wheel attachment 10 on the vehicle wheel 12 is given with or without the tire 16.

The structural design of the first embodiment of the emergency wheel attachment 10 is more readily apparent from the exploded representation in FIG. 1. The emergency wheel attachment 10 accordingly comprises a substantially annular mounting unit 18, which is used to fit the emergency wheel attachment 10 on the vehicle wheel 12, more precisely on its rim 14, and further comprises a substantially likewise annular tread unit 20, which in the operating state of the emergency wheel attachment 10 contacts with a tread 21 a road on which the vehicle wheel 12 is intended to roll with the emergency wheel attachment 10 fitted thereto. In the exemplary embodiment shown, the mounting unit 18 and the tread unit 20 form two assemblies separate from one another, which are fitted successively to the vehicle wheel 12. In other embodiments, not shown here, the mounting unit 18 and the tread unit 20 can formed a single unit connected to one another, which is fitted as such on a vehicle wheel 12.

To attach the mounting unit 18 to the vehicle wheel 12, the mounting unit 18 in the exemplary embodiment according to FIG. 1 has six retaining claws 22, the construction of which emerges more clearly from FIGS. 23 to 31 and which are formed in each case to engage with a retaining claw head 24, configured in the form of a hook, behind a rim flange 26 of the rim 14 and to rest in the fitted state firmly on the rim flange 26. This state is clearly visible from FIG. 4, which shows the section IV-IV from FIG. 2. The six retaining claws 22 are arranged distributed over the circumference of the mounting unit 18 and each extend radially outwards. The retaining claws 22 can be arranged spaced uniformly at a distance from one another in the circumferential direction, but in the exemplary embodiment according to FIG. 1 are arranged in two groups of three, of which one group of three retaining claws 22 is located on the left side with reference to the line of intersection IV-IV and the other group of three is located on the right side of the mounting unit 18.

In the exemplary embodiment shown according to FIG. 1, all retaining claws 22 are executed radially movably to be able to change the distance of the retaining claw heads 24 from the center point of the mounting unit 18. To this end each retaining claw 22 is supported guided radially in a substantially annular basic body 28 of the mounting unit 18. A groove 34 extending radially in the basic body 28 and limited by two lateral extensions 30 and a base 32 is used for guidance in the exemplary embodiment shown. Each retaining claw 22 has a retaining arm 36, which is formed here integrally with the associated retaining claw head 24 and is arranged radially displaceably in the guide groove 34. At the end of each retaining claw 22 opposite the retaining claw head 24, the retaining arm 36 is provided with a threaded hole 38 for receiving a threaded spindle 40, one end portion of which is screwed into the threaded hole 38. Arranged on the threaded spindle 40 at or close to the other end of the threaded spindle 40 is a pinion formed here as a bevel (gear)wheel 42.

To couple the radially directed inward or outward movement of all radially movable retaining claws 22, an annular actuating element is used, which according to the first embodiment shown in FIGS. 1 to 4 is an annular actuating disc 46 with internal teeth 48 formed on its inner circumference. The actuating disc 46 is supported rotatably on the basic body 28 of the mounting unit 18 such that its internal teeth 48 mesh with each bevel gear 42.

To be able to set the actuating disc 46 in rotation, supported rotatably on an axial bearing pin 50 of the basic body 28 is a drive pinion 52 likewise formed as a bevel gear, which meshes with the internal teeth 48 of the actuating disc 46. The drive pinion 52 is provided for actuation with a nut executed here as a cap nut 54, which extends axially beyond the actuating disc 46. A substantially annular cover 56 is attached by screws 58 to the basic body 28 and together with the basic body 28 forms a housing 60 of the mounting unit 18 in which the retaining claws 22 (partially), the bevel gears 42, the actuating disc 46 and the drive pinion 52 are located. The cap nut 54 of the drive pinion 52 protrudes axially from the housing 60 through an opening 62 in the cover 56 so that the drive pinion 52 can be set in rotation by means of a spanner or using another suitable tool.

Such a rotation of the drive pinion 52 leads to a rotation of the actuating disc 46 about an axis of rotation A, which coincides in the operating state of the emergency wheel attachment 10 with the axis of rotation of the vehicle wheel 12 (see FIG. 4). The rotation of the actuating disc 46 is transmitted to the bevel gears 42 of the retaining claws 22, whereby all radially movable retaining claws 22 are moved synchronously radially outwards or radially inwards depending on the direction of rotation of the drive pinion 52. It is understood that the spindle nut arrangement formed respectively by a bevel gear 42 and a threaded spindle 40 can either have a non-rotatable threaded spindle 40 and a bevel gear 42 arranged rotatably on this or alternatively a bevel gear 42 arranged non-rotatably on the threaded spindle 40, wherein the threaded spindle 40 must then be arranged freely rotatably in the threaded hole 38 of the retaining arm 36.

If a radially movable retaining claw is spoken of in the context of the present description, this means a not necessarily exclusively radial movement but rather a movement taking place substantially in a radial direction. It is clear from FIG. 4, for example, that the movement direction of the retaining claws 22 is not exactly in a plane E perpendicular to the axis of rotation A, but runs in a plane F inclined at an angle β of 5° to the plane E. In other words, in a radially outward movement each retaining claw 22 moves not only radially outwards but also axially slightly towards the rim 14 of the vehicle wheel 12 and vice versa.

In an initial state of the mounting unit 18, all radially movable retaining claws 22 are positioned such that the mounting unit 18 can be placed from outside onto the vehicle wheel 12 so that each retaining claw head 24 is located in the region of the rim flange 26, but radially somewhat outside of this. The mounting unit 18 is then pressed axially against the vehicle wheel 12 and at the same time the drive pinion 52 is rotated so that the retaining claws 22 move radially inwards, so that the retaining claw heads 24 can engage behind the rim flange 26. Rotation of the drive pinion 52 is continued until the retaining claw heads 24 come into fixed contact with the rim flange 26. The drive pinion 52 is normally rotated until a previously determined torque, for example 60 Nm, is attained, which ensures that each retaining claw head 24 rests firmly on the rim flange 26 and thus the entire mounting unit 18 is connected reliably to the vehicle wheel 12.

The tread unit 20 is then placed onto the mounting unit 18 attached in such a way to the vehicle wheel 12. Several locating bolts 64 configured here as threaded bolts are used for this, which bolts protrude axially or at least substantially axially from the housing 60 of the mounting unit 18 on the side facing away from the vehicle wheel 12. In the exemplary embodiment shown in FIG. 1, such a locating bolt 64 is attached or formed in each case on the retaining arm 36 of each retaining claw 22 and is thus not directed strictly axially, but inclined at the angle β to the plane E. In other embodiments the locating bolts 64 can protrude axially from the basic body 28. To position the tread unit 20 on the mounting unit 18, a series of positioning pins 66 are used, which are attached or formed here on the basic body 28 and project axially outwards.

In the exemplary embodiment shown in FIG. 1, the tread unit 20 consists of two substantially semi-circular ring segments 68 and 70, which are affixed one after another to the mounting unit 18 attached to the vehicle wheel 12. First the upper segment 68 in FIG. 1 is pushed onto the corresponding locating bolts 64 and positioning pins 66 (each segment 68 and 70 is provided for this purpose with corresponding openings 72 and positioning recesses 74). Then a cap nut 76 is screwed onto the two upper locating bolts 64 extending through the segment 68 in each case to press the segment 68 against the mounting unit 18 and attach it to the latter. By moving a vehicle (not shown) equipped with the vehicle wheel 12 forwards or backwards the vehicle wheel 12 is then rotated so far that the segment 68 initially located on top moves to a bottom position. In this case the tread 21 of the segment 68 comes into contact with the road surface on which the vehicle wheel 12 is located. Now the second segment 70 of the tread unit 20 can be fitted in the same way as the segment 68. Following tightening of the associated cap nuts 76 by a predetermined torque, the emergency wheel attachment 10 is ready for operation.

In the embodiment depicted in FIG. 1, two openings 72 are located on the separating line between the two segments 68 and 70 of the tread unit 20. To create a load-bearing connection between the two segments 68, 70 here, the second segment 70 is provided in the region of each split opening 72 with a bridging lug 78, which is attached to the second segment 70 and is pressed against the first segment by tightening the associated cap nut 76.

To remove the emergency wheel attachment 10, the procedure is carried out in reverse order, i.e. first the cap nuts 76 are undone and the two segments 68, 70 of the tread unit 20 are removed one after another from the mounting unit 18. The drive pinion 52 of the mounting unit 18 is then rotated in a direction that causes the retaining claws 22 to move radially outwards. After the retaining claw heads 24 have been released from the rear engagement with the rim flange 26, the mounting unit 18 can be removed from the vehicle wheel 12.

In a modification of the first embodiment, not shown here, the actuating disc 46 can have, in addition to the internal teeth 48, external teeth intended for meshing with the drive pinion 52. The drive pinion 52 in this embodiment is arranged radially outside of the actuating disc 46 in contrast to the arrangement shown in FIG. 1. The internal teeth 48 in this modified embodiment are used only to transmit the rotary movement of the actuating disc 46 to the bevel gears 42.

FIGS. 5 and 6 show a second embodiment of an emergency wheel attachment 10a that is somewhat modified compared with the first embodiment. The principal difference consists in the configuration of the actuating disc and the pinions associated with the retaining claws 22. Although the annular actuating disc 46a of the second embodiment also has internal teeth 48, these are only used to mesh with the drive pinion 52, which is executed in the second embodiment as a normal spur gear. The transmission of a rotary movement of the actuating disc 46a to the radially movable retaining claws 22 is achieved by means of an array of slot-shaped openings 80 of the actuating disc 46a, which mesh with pinions 44a, which are connected to the threaded spindle 40 of the associated retaining claw 22 in each case. In contrast to the first embodiment, in which the pinions were each configured as a bevel gear, the pinions 44a are normal spur gears. The function of this second embodiment corresponds to that of the first embodiment and is clearly apparent from FIG. 6, which only depicts the interplay between drive pinion 52, actuating disc 46a and the pinions 44a of the retaining claws 22.

Similar to a modification explained above in connection with the first embodiment, the second embodiment can be modified such that the drive pinion 52 is arranged not radially inside the actuating disc 46a, but radially outside of this. The internal teeth 48 can then be omitted, but external teeth must be provided instead on the actuating disc 46a so that a rotary movement of the drive pinion 52 can be transmitted to the actuating disc 46a.

FIGS. 7 and 8 show a third embodiment of an emergency wheel attachment 10b, which differs from the two embodiments described previously in that instead of an annular actuating disc, a chain 82 is used as an annular actuating element. For greater clarity, only the mounting unit 18 is shown (and this only partially) in FIGS. 7 and 8.

In FIG. 7, the chain 82 is arranged and guided in the shape of a ring in the housing of the mounting unit 18. A rotary movement of the drive pinion 52 rotates the chain 82 about the axis of rotation A and the chain 82 transmits this movement to transmission pinions 44b, which are supported rotatably on the basic body 28 and the axis of rotation of which runs parallel to the axis of rotation A (in contrast to this, the axis of rotation of pinions and 44a of the first and second embodiment is the substantially radially running central longitudinal axis of the associated threaded spindle 40 in each case). In a further contrast to the first two embodiments, the radially extending retaining arm 36b in the third embodiment is provided on one side with rack-like teeth 84, which mesh with the associated transmission pinion 44b, which in turn meshes with the chain 82. Each rotary movement of the transmission pinion 44b is thus converted into a radial translatory movement of the associated retaining claw 22, which movement is directed either radially outwards or radially inwards depending on the direction of rotation of the drive pinion 52.

FIG. 8 shows a modified exemplary embodiment of the third embodiment in which the chain 82 does not run in a ring shape but runs in a linear manner in each case between the transmission pinions 44b and the drive pinion 52.

According to a modification of the third embodiment, not shown here, one of the transmission pinions 44b can form the drive pinion at the same time. To do this, only one of the transmission pinions 44b needs to be provided with a nut, for example the cap nut 54 shown. The separate drive pinion 52 of FIG. 7 and FIG. 8 can then be omitted.

In another difference from the first two embodiments, the exemplary embodiments of the third embodiment shown in FIGS. 7 and 8 only have three radially movable retaining claws 22, which are spaced uniformly from one another in the circumferential direction of the mounting unit 18. It is understood, however, that the third embodiment can also have more or fewer radially movable retaining claws 22.

FIGS. 9 to 14 show exemplary embodiments of a fourth embodiment of an emergency wheel attachment 10c. The difference from the aforesaid three embodiments consists in the transmission of a rotary movement of the drive pinion 52 to the radially movable retaining claws 22.

A first exemplary embodiment of the fourth embodiment is shown in FIGS. 9 and 10 and has an annular actuating disc 46c, which is provided with external teeth 86, which mesh with the drive pinion 52 arranged here radially outside of the actuating disc 46c. Several elevations 88 in the shape of a spiral segment are formed, seen in a circumferential direction of the actuating disc 46c, on the side of the actuating disc 46c facing the retaining claws 22, which elevations each form a motion link 90 in the shape of a spiral segment. Formed on the surface of each retaining arm 36c facing this side of the actuating disc 46c are several link blocks spaced radially at a distance from one another in the form of a short rib 92 in the shape of a spiral segment, two of which blocks respectively interact with the motion link 90 formed by the elevation 88 in the shape of a spiral segment on the actuating disc 46c. As is readily apparent, a rotation of the actuating disc 46c caused by a rotation of the drive pinion 52 leads to each movable retaining claw 22 moving either radially outwards or radially inwards depending on the direction of rotation of the drive pinion 52. The several ribs 92 in the shape of a spiral segment on the retaining arm 36c make it possible to arrange each retaining claw 22 in an initial state in a position lying radially further out or radially further in, in order to take account of different diameters of a vehicle wheel 12 (for example, 15 inches as the smallest size and 19 inches as the biggest size of a vehicle wheel 12 on which the emergency wheel attachment 10 fits).

In contrast to the three embodiments explained previously, in the first exemplary embodiment of the fourth embodiment shown in FIGS. 9 to 12, each retaining claw 22 is implemented as a double claw with two retaining claw elements 94 spaced at a distance from one another in the circumferential direction, which are separated from one another by a gap 96 and are affixed on the common retaining arm 36c. It is understood that such retaining claws formed as a double claw can also be used in the embodiments discussed previously and in embodiments discussed below. In a further difference from the first three embodiments, two retaining claws 22 are each provided with two locating bolts 64 in the first exemplary embodiment of the fourth embodiment. A configuration of this kind can also be used in the embodiments previously discussed and yet to be described below.

Finally, according to a modification, not shown, of the first exemplary embodiment of the fourth embodiment, the actuating disc 46c can have internal teeth instead of external teeth 86, wherein the drive pinion 52 is then arranged by analogy with the first two embodiments radially inside the actuating disc.

FIG. 13 shows a second exemplary embodiment of the fourth embodiment, in which the elevations 88 in the shape of a spiral segment each overlap slightly seen in the circumferential direction of the actuating disc 46c. In other words, several motion links 90 in the shape of a spiral segment formed by the elevations 88 are arranged radially adjacent to one another on each section of the actuating disc 46c associated with a radially movable retaining claw 22. A better force transmission from the actuating disc 46c to each retaining arm 36c can be achieved hereby.

FIG. 14 shows a third exemplary embodiment of the fourth embodiment, in which only a single, continuous elevation 88 in the shape of a spiral segment is arranged on the actuating disc 46c. It is understood that each retaining arm 36c then only needs to have two ribs 92 in the shape of a spiral segment as link blocks (but can also have more than just two ribs 92).

FIGS. 15 to 17 show a fourth and fifth exemplary embodiment of the fourth embodiment in which the at least one or each motion link 90 in the shape of a spiral segment is formed by an opening 98 of the actuating disc 46c respectively in the shape of a spiral segment. For example, instead of the single elevation 88 in the shape of a spiral segment that was described in connection with the previous exemplary embodiment, the actuating disc 46c can have a single continuous opening 98 in the shape of a spiral segment.

In the fourth exemplary embodiment of the fourth embodiment shown in FIG. 15, the actuating disc 46c has, seen in the circumferential direction of the actuating disc, three openings 98, which are in the shape of a spiral segment and are each provided to interact with a retaining claw 22. Each retaining claw 22 is provided for this with a link block in the form of a pin 100, which is fastened or formed on the retaining arm 36c and is guided in the associated opening 98 in the shape of a spiral segment. Analogous to the function of the first three exemplary embodiments of the fourth embodiment, each rotary movement in the fourth exemplary embodiment also of the drive pinion 52 arranged here radially inside the actuating disc 46c is converted by the motion links 90 in the shape of a spiral segment into a radially directed translatory movement of the retaining claws 22. It is understood that instead of the drive pinion 52 arranged radially inside the actuating disc, a drive pinion arranged radially outside of the actuating disc can also be used, then in connection with external teeth of the actuating disc 46c (the internal teeth of which can then be omitted).

FIGS. 16 and 17 show a fifth exemplary embodiment of the fourth embodiment, once more with three openings 98 in the shape of a spiral segment that are spaced at a distance from one another in the circumferential direction of the actuating disc, but the incline of which in the fifth exemplary embodiment has been selected to be steeper than in the fourth exemplary embodiment. This makes it possible to provide teeth of the actuating disc 46c, which are formed here as external teeth 86, only on one part of the circumference of the actuating disc 46c, as further teeth for travelling the maximally possible radial displacement path of the retaining claws 22 are not necessary. FIG. 17 illustrates that the retaining arm 36c of each retaining claw 22 can be fitted in various radial positions with reference to the actuating disc 46c by the provision of attachment holes 102 spaced radially at a distance from one another so as to permit adaptation to different wheel or rim sizes.

FIGS. 18 and 19 show a fifth embodiment of an emergency wheel attachment 10d with an internally toothed annular actuating disc 46d, which by analogy with the third embodiment transmits a rotation of the drive pinion 52 via transmission pinions 44b and rack-like teeth 84 to the retaining claws 22 or converts this into a radial movement of the retaining claws 22. FIG. 19 shows a modification of this fifth exemplary embodiment in which the top transmission pinion 44b in FIG. 18 has been provided with a cap nut 54 so that it can act as a drive pinion 52 at the same time. The separate drive pinion 52 shown in FIG. 18 is thus superfluous.

FIG. 20 shows an emergency wheel attachment 10, for example according to the first or second embodiment, which is fitted to a vehicle wheel 12 and on which, to make it easier to affix the mounting unit 18 to the vehicle wheel, the housing 60 of the mounting unit 18 is provided with a handle 104, which spans the free center of the housing 60, is attached to the housing 60 and is curved slightly convexly outwards. A handle 104 of such a kind or similar makes it possible to hold the mounting unit 18 more easily on a vehicle wheel 12 during mounting and to press it against the vehicle wheel 12 or the rim 14. A handle 104 of such a kind or similar can also be used on the other embodiments discussed previously.

For a better understanding of the process of attaching the retaining claws 22, FIGS. 21 and 22 show a single retaining claw 22 in a state assumed by each retaining claw 22 at the start of attachment of the mounting unit 18 to a vehicle wheel 12. In this case FIG. 22 shows the section A-A from FIG. 21. It can be recognised clearly from FIG. 22 in particular that the free end of the retaining claw head 24, which is curved in the manner of a hook, must be inserted into a gap present between the tire 16 and the rim flange 26 of the rim 14 so that the retaining claw head 24 can engage behind the rim flange 26. To make this insertion of the front region of the retaining claw head 24 easier, an end section 106 comprising the free end of the retaining claw head 24 can be provided with one or more recesses 108 on its surface facing the tire 16. These recesses 108, designed here roughly in the form of a dome, enable a portion of the rubber material of the tire 16 to press into the recesses 108 when the retaining claw head 24 is inserted into said gap and thereby to reduce the pressure that has to be applied to insert the retaining claw head 24 into said gap. The recesses 108 thus lead to simpler mounting.

To be able to determine better whether a mounting unit 18 has been attached correctly to a vehicle wheel 12 or rim 14, at least one retaining claw 22 (but preferably each radially movable retaining claw 22) is provided with a display device that signals a correctly fitted state. As shown in FIGS. 25 to 27, each retaining claw 22 is provided with a radially extending stop surface 110 with which it rests on an outer side of the rim 14 in the correctly fitted state of the emergency wheel attachment. Located in the region of this radial stop surface 110 is a pin-shaped indicator element 112 here passing through the retaining claw axially in the region of the stop surface 110, which element is pretensioned by a spring 114 arranged in a hole receiving the indicator element 112 in such a way that in the non-fitted state of the retaining claw 22, the end of the indicator element 112 facing the rim 14 protrudes from the radial stop surface 110. The opposite, other end of the indicator element 112, which acts as an indicator, is then located, seen from outside, deep in said hole and is therefore not visible or is only barely visible from outside (see FIG. 26).

When the mounting unit 18 is fitted correctly, the stop surface 110 of each retaining claw 22 rests on the outside of the rim 14, which leads to the end of the indicator element 112 facing the rim now being arranged flush with the stop surface 110. Due to pressing of the indicator element 112 into the receiving hole, the axially outer end of the indicator element 112 acting as the indicator is moved so that it is clearly visible from outside and thereby signals the correct mounting state. For example, this end of the indicator element 112 can be marked by a green colour to display the correct mounting by appearance of the green marking in the part of the receiving hole visible from outside.

FIGS. 28 and 29 explain a modified embodiment of a retaining claw 22. Such a modified retaining claw 22, which can be used on each of the previously explained embodiments and exemplary embodiments, has a central contact portion 116 for contacting the rim flange 26 as well as at least one (here two) security portion(s) 118 arranged adjacent to the contact portion 116 in the circumferential direction. As can be recognised clearly from FIG. 29, each security portion 118 does not rest in the operating state of the emergency wheel attachment on the rim flange 26, but has a small spacing x from the rim flange 26, which can be in the range of 0.2 to 0.5 mm and is preferably approximately 0.3 mm. The contact portion 116, on the other hand, is fixedly braced with the rim flange 26 in the operating state of the emergency wheel attachment.

If overloading causes a break in the contact portion 116 in operation of the emergency wheel attachment, this does not lead thus to failure of the emergency wheel attachment because the security portion 118 or the security portions 118 arranged as here on both sides of the contact portion 116 ensure that the retaining claw 22 with the defective contact portion 116 cannot become detached from the vehicle wheel 12. Due to the spacing x between each security portion 118 and the rim flange 26, however, a rattling noise occurs in an intended manner in further operation of the emergency wheel attachment that is intended to alert a driver of the vehicle in question to the fact that something is not in order with the emergency wheel attachment.

FIG. 30 shows a retaining claw 22 implemented as a double claw with two retaining claw elements 94, which are spaced further apart from one another in the circumferential direction in contrast to the implementation shown in FIGS. 9 and 10. Each retaining claw element 94 can be formed with a contact portion 116 and at least one security portion 118 as explained previously in connection with FIGS. 28 and 29.

FIG. 31 shows a plan view of yet another modified embodiment of a retaining claw 22 configured as a double claw on which each retaining claw element 94 represents a separate element, which is fitted on the common retaining arm 36 such that it can rotate to a small extent about an axis Y that runs perpendicular to a plane spanned through the common retaining arm 36. The extent of the possible rotary movement of each retaining claw element 94 is determined by the convex configuration of a lateral stop face 120 on the retaining arm 36 and an elongated hole 122 running in a circumferential direction in which a fixing pin (not shown) is located, which serves as a limit stop for the rotary movement of the retaining claw element 94. Each retaining claw element 94 is supported rotatably on the locating bolt 64, as shown in FIG. 31.

The embodiment of a double claw shown in FIG. 31 also makes it possible in the case of retaining claw elements 94 lying further apart in the circumferential direction that each retaining claw element 94 comes into the correct contact with the rim flange 26 in the course of the radial inward movement of a retaining claw 22. Any angular errors that may result from manufacturing inaccuracies, for example, are compensated by twisting of the retaining claw elements that takes place automatically on fastening.

FIGS. 32 and 33 show an embodiment of an emergency wheel attachment 10 according to one of the previously explained exemplary embodiments, which has at least one and preferably several self-bracing security claws 124 in addition to the radially movable retaining claws 22. Each security claw 124 is part of the tread unit 20 and can thus not be moved radially inwards or radially outwards by a rotation of the drive pinion 52. Instead of this, each security claw 124 has an actuating slider 126, which passes through the tread 21 of the tread unit 20 and protrudes radially from the tread 21 in an initial state (see FIG. 32). The actuating slider 126 is pretensioned radially outwards by a spring 128 acting on it. In this initial state of the security claw 124, the security claw 124 is not yet located in engagement with the rim 14 of the vehicle wheel 12.

Once the emergency wheel attachment 10 has been fitted, however, it is the case in operation of the emergency wheel attachment that the tread 21 rolls on a road surface and the actuating slider 126 is thereby pressed radially inwards, whereby each security claw 124 presses behind the rim flange 26 of the rim 14. A position of the security claw 124 is thus achieved that corresponds to that of a correctly fitted retaining claw 22. To achieve this position, however, no intervention of a user of an emergency wheel attachment 10 equipped in this way is required, on the contrary this position is reached of itself in operation of the emergency wheel attachment, which is why the security claw 124 is described as self-bracing.

To prevent a security claw 124 that has engaged with the rim flange 26 from becoming detached again unintentionally, each security claw 124 is equipped with a locking device, which following a displacement of the actuating slider 126 radially inwards prevents the actuating slider 126 from moving radially outwards. In the exemplary embodiment shown, this locking device is formed by lateral ribbing 130 on the actuating slider 126 that interacts with a plate of spring steel (not shown) adjusted obliquely radially inwards, wherein the free end of this spring steel plate lies in a latching manner in the lateral ribbing 130 and thereby prevents a reverse movement of the actuating slider 126 radially outwards. Such ribbing 130 can be present alternatively or additionally also on the opposite side of the actuating slider 126 (likewise in interaction with a spring steel plate).

A security claw 124 of the type described is arranged, seen in the circumferential direction of the emergency wheel attachment, preferably between two radially movable retaining claws 22 respectively. For example, in embodiments with three radially movable retaining claws 22, a security claw 124 can be located in each case between two adjacent retaining claws 22 in a circumferential direction, so that such an embodiment has three radially movable retaining claws 22 and three security claws 124 in total. Other combinations are naturally possible.

As already explained, the tread unit 20 is attached to the mounting unit 18 in some embodiments in that nuts are tightened on locating bolts implemented as threaded bolts with a predetermined torque. So that a user can easily recognise when this prescribed torque has been reached, these nuts are formed according to one embodiment as cap nuts 76, wherein contained in each cap nut 76 is an optical and/or acoustic display device, which signals a correct mounting state. An exemplary embodiment of such a cap nut 76 is shown in FIGS. 34 to 36.

FIG. 35 shows such a cap nut 76 in an initial position. Arranged in the cap nut 76 top center is a tappet 132, which is supported by a spring plate 134, which is pretensioned axially inwards in the initial position shown in FIG. 35 and is supported on the upper inside of the cap nut 76. The inside 136 of the tappet 132, which is executed with a larger diameter, is provided to come into contact with the free end of a locating bolt 64 (not shown), onto which the cap nut 76 is to be screwed.

When the free end of the locating bolt 64 comes into contact with the inside 136 of the tappet 132 on reaching the prescribed torque, the axially inwardly directed force of the spring plate 134 is exceeded and the tappet 132 jumps axially outwards into a second position, in which an indicator element 138 that is preferably marked in colour ends flush with the outer surface of the cap nut 76 (see FIG. 36). The "jumping" of the spring plate 134 into the position reproduced in FIG. 36 is acoustically perceptible. Furthermore, the indicator element 138 ending flush with the outer surface of the cap nut 76 indicates that the correct mounting state of the tread unit 20 on the mounting unit 18 has now been reached.

As is evident from FIGS. 35 and 36 and in particular from the respectively associated detailed representation, the tappet 132, the spring plate 134 and the indicator element 138 are part of a display device, which is attached as a unit in the cap nut 76. A housing of the display device consists of a ring nut and a cover. The cover is screwed from above into the ring nut and braces the spring plate 134 against the tappet 132. The ring nut for its part is screwed into an internal thread of the cap nut 76, which is open at the top (the nut 76 is thus made into a cap nut here only by the cover). The indicator element 138 is guided in a central hole in the cover.

FIGS. 37 and 38 show a sixth embodiment of an emergency wheel attachment according to the invention, on which the tread unit 20 or its segments (for example, the segments 68 and 70 described previously) are not attached by screwing them to the mounting unit 18. Instead of this, the sixth embodiment is provided with latching devices, which are arranged on the side of the emergency wheel attachment facing away from the vehicle wheel 12. In the embodiment shown in FIGS. 37 and 38, each latching device 140 comprises a radially movable slider 142, which is affixed on the outside of the housing 60 of the mounting unit 18, more precisely on the cover 56 of the mounting unit 18, by means of four screws 144, two of which extend in the exemplary embodiment shown through an elongated hole 146 formed on the upper side of the slider 142 and running substantially radially. The other two screws 144 extend through another elongated hole 148, which runs parallel to the first elongated hole 146. As emerges clearly from the enlarged detailed representation belonging to FIG. 37, a retaining lug 150 is located in each slider 142, which lug is attached in the exemplary embodiment shown on the radially inner edge of the cover 56 of the mounting unit 18, for example by screws, rivets or similar, but the retaining lug can also be cast integrally with the cover or welded onto the cover 56. The retaining lug 150 is used to support a spring 152, which elastically pretensions the slider 142 radially outwards.

The radially outer end face of each slider 142 is formed as an inclined ramp or run-up surface 154, which on mounting of the tread unit 20 or the segments 68, 70 of the tread unit 20 comes into contact with an associated surface or edge of the tread unit 20, so that on pressing of the tread unit 20 or of a segment 68, 70 of the same in a direction directed axially towards the mounting unit 18, the slider 142 is first displaced radially inwards until the outside of the tread unit 20 facing away from the vehicle wheel 12 has passed the underside of the slider 142. In this moment, the slider 142 moves radially outwards again on account of its spring pretensioning acting radially outwards and the underside of the slider 142 moves over the outside of the tread unit 20, whereby the tread unit 20 or a segment of the same is locked in the correctly fitted position. The section through a slider 142 and surrounding components that is reproduced in FIG. 38 illustrates this latched state.

If it is intended to release such an automatically latching tread unit 20 from the mounting unit 18, the sliders 142 only need to be pressed radially inwards into a position in which the underside of each slider 142 no longer overlaps with the outside of the tread unit 20.

The self-latching configuration shown in FIGS. 37 and 38 is not bound to any definite configuration of an emergency wheel attachment. It can be used for all previously depicted and described embodiments of the emergency wheel attachment and furthermore even for embodiments of an emergency wheel attachment not described or depicted here.

As likewise already explained, when fitting the mounting unit 18 to a vehicle wheel 12, the drive pinion 52 is operated in a rotating manner until a prescribed torque is reached, at which it is ensured that all radially movable retaining claws 22 rest securely on the rim flange 26. To prevent excessively tight bracing of the retaining claws 22, the drive pinion 52 on some embodiments of the emergency wheel attachment 10, which pinion is coupled or can be coupled to the actuating element, is equipped with a torque-limiting device. Such a torque-limiting device is located according to a configuration shown in FIG. 39 in the cap nut 54 of the drive pinion 52 and consists of several spring washers 156 arranged above one another and located in mutual contact, which in the manner of a slipping multiple disc clutch prevent more than a predetermined torque from being able to be introduced into the emergency wheel attachment 10 when the drive pinion 52 is rotated. The package of spring washers 156 transmits any rotary movement of the cap nut 54 to the drive pinion 52 only until the friction force set between the spring washers 156 by appropriate pretensioning of the spring package is exceeded. Upon further rotation of the cap nut 54, the individual spring washers 156 "slip" relative to one another in the circumferential direction so that any further rotary movement can no longer reach the drive pinion 52.

An alternative configuration of such a torque-limiting device is shown in FIG. 40. Here the slipping clutch consists of two clutch discs 158 and 160 facing one another, which are formed on their surfaces facing one another with cake-slice-like elevations 162 and cake-slice-like recesses 164 arranged respectively alternating in a circumferential direction. Seen in the tightening direction of rotation here, each flank 166 of an elevation 162 and the associated flank 168 of the corresponding recess 164 is implemented bevelled, so that once a torque, which is defined by a spring force pressing the clutch discs 158, 160 onto one another, is exceeded, the clutch disc 158 begins to slip over the clutch disc 160, whereby a passing of the rotary movement on to the drive pinion 52 is prevented as in the exemplary embodiment described previously.

The invention claimed is:

1. An emergency wheel attachment for a vehicle wheel having a rim and a tire arranged on the rim, the emergency wheel attachment configured to be placed onto an outside of the vehicle wheel and to enable a driving operation with a restricted tire function in an operating state in which the emergency wheel attachment is attached to the vehicle wheel, the emergency wheel attachment comprising:

an annular mounting unit configured to mount the emergency wheel attachment on the vehicle wheel, and an annular tread unit configured to contact, in the operating state of the emergency wheel attachment, a road on which the vehicle wheel is intended to roll,
wherein the annular mounting unit is provided with at least two retaining claws configured to fasten the annular mounting unit to the rim of the vehicle wheel by engaging behind a rim flange of the rim, wherein at least one of the retaining claws is radially movable relative to the mounting unit so as to change a distance of the at least one of the radially movable retaining claws from a center point of the annular mounting unit,
wherein the annular mounting unit has an annular actuating element, rotatable about an axis of rotation coinciding with a vehicle wheel axis in the operating state of the emergency wheel attachment and forming part of a gear mechanism configured to convert a rotation of the annular actuating element into a radial movement of the at least one of the radially movable retaining claws,
and wherein the annular mounting unit includes a drive device configured to be coupled to the annular actuating element and the actuation of which causes a rotation of the annular actuating element.

2. The emergency wheel attachment according to claim 1, wherein the actuating element is a chain and the drive device is a rotatable drive pinion configured to mesh with the chain.

3. The emergency wheel attachment according to claim 2, wherein the at least one of the radially movable retaining claws is provided with a retaining arm extending radially inwards from the retaining claw, which arm has rack-like teeth on one side that mesh with a rotatable transmission pinion associated with the at least one of the radially movable retaining claw, which rotatable transmission pinion in turn meshes with the chain.

4. The emergency wheel attachment according to claim 1, wherein the actuating element has an annular actuating disc.

5. The emergency wheel attachment according to claim 4, wherein the annular actuating disc has internal teeth or external teeth and the drive device is a rotatable drive pinion configured to mesh with the internal teeth or the external teeth.

6. The emergency wheel attachment according to claim 5, wherein the annular actuating disc is provided with an annular array of recesses or openings, and associated with the at least one of the radially movable retaining claws is a pinion which meshes with the recesses or openings of the annular actuating disc and which is connected to a threaded spindle which, in turn, is connected to the at least one of the radially movable retaining claws and which converts a rotary movement of the pinion into an at least substantially radially directed translatory movement of the retaining claw.

7. The emergency wheel attachment according to claim 5, wherein the annular actuating disc has internal teeth, wherein the rotatable drive pinion meshes with the internal teeth, and associated with the at least one of the radially movable retaining claws is a bevel gear which meshes with the internal teeth of the annular actuating disc and is connected to a threaded spindle which, in turn, is connected to the at least one of the radially movable retaining claws and which converts a rotary movement of the bevel gear into an at least substantially radially directed translatory movement of the at least one of the radially movable retaining claws.

8. The emergency wheel attachment according to claim 5, wherein the annular actuating disc has internal teeth and external teeth, wherein the rotatable drive pinion meshes with the external teeth, and associated with the at least one of the radially movable retaining claws is a bevel gear which meshes with the internal teeth of the annular actuating disc and is connected to a threaded spindle which, in turn, is connected to the at least one of the radially movable retaining claws and which converts a rotary movement of the bevel gear into an at least substantially radially directed translatory movement of the at least one of the radially movable retaining claws.

9. The emergency wheel attachment according to claim 5, the at least one of the radially movable retaining claw is provided with a retaining arm extending radially inwards from the at least one of the radially movable retaining claws, which arm has rack-like teeth on one side that mesh with a rotatable transmission pinion associated with the at least one of the radially movable retaining claws and which, in turn, meshes with the internal teeth or the external teeth of the annular actuating disc.

10. The emergency wheel attachment according to claim 3, wherein, for the at least one of the radially movable retaining claws the drive pinion also functions as a transmission pinion.

11. The emergency wheel attachment according to claim 4, wherein the actuating disc has at least one motion link in the shape of a spiral segment, which interacts with a link block, arranged on a retaining arm connected to the at least one of the radially movable retaining claws, to change the distance of the at least one of the radially movable retaining claws from the center point of the annular mounting unit.

12. The emergency wheel attachment according to claim 11, wherein on each section of the annular actuating disc associated with a radially movable retaining claw, several motion links in the shape of a spiral segment are arranged adjacent to one another.

13. The emergency wheel attachment according to claim 12, wherein the retaining arm of the at least one of the radially movable retaining claws is provided with several link blocks arranged adjacent to one another to interact with several motion links.

14. The emergency wheel attachment according to claim 11, wherein each link block has the form of a pin.

15. The emergency wheel attachment according to claim 11, wherein each link block has the form of a short rib in the shape of a spiral segment.

16. The emergency wheel attachment according to claim 11, wherein the at least one motion link is an elevation in the shape of a spiral segment on the annular actuating disc or is an opening of the annular actuating disc in the shape of a spiral segment.

17. The emergency wheel attachment according to claim 11, wherein, in the circumferential direction of the annular actuating disc, several motion links in the shape of a spiral segment are provided.

18. The emergency wheel attachment according to claim 1, wherein the at least one of the movable retaining claws has a contact portion for contacting the rim flange, and at least one security portion arranged next to the contact portion and which, in the operating state of the emergency wheel attachment, has a small spacing from the rim flange of approximately 0.3 mm.

19. The emergency wheel attachment according to claim 1, wherein the at least one of the movable retaining claws, in the region of an end portion of a free end of the at least one of the movable retaining claws, is provided with one or more recesses on a side of the at least one of the movable retaining claws facing the tire to facilitate mounting.

20. The emergency wheel attachment according to claim 1, wherein the at least one of the movable retaining claws is implemented as a double claw with two retaining claw elements spaced at a distance from one another in the circumferential direction and are affixed to a common retaining arm.

21. The emergency wheel attachment according to claim 20, wherein at least one of the two retaining claw elements is adapted to be rotatable relative to the common retaining arm about an axis which runs perpendicular to a plane spanned by the common retaining arm.

22. The emergency wheel attachment according to claim 1, wherein the at least one of the movable retaining claws has a radially extending stop surface with which it rests in the operating state of the emergency wheel attachment on an outside of the rim, and wherein the at least one of the movable retaining claws is provided with an indicator element which is pretensioned elastically in the direction of the rim and which passes through the at least one of the movable retaining claws in the region of the stop surface, and wherein an end of the indicator element facing the rim is configured to contact the rim and an opposing, other end of the indicator element displays correct mounting of the annular mounting unit in the operating state of the emergency wheel attachment.

23. The emergency wheel attachment according to claim 1, wherein the annular tread unit is a unit separate from the annular mounting unit and includes several annular segments, wherein the annular tread unit is adapted for connection to the annular mounting unit and is connected to the mounting unit in the operating state of the emergency wheel attachment.

24. The emergency wheel attachment according to claim 23, wherein locating bolts, arranged protruding on a side of the annular mounting unit facing away from the vehicle wheel, are used to connect the annular tread unit to the mounting unit.

25. The emergency wheel attachment according to claim 24, wherein the locating bolts are threaded bolts and the annular tread unit is attached by nuts to the annular mounting unit to screw the annular tread unit on the annular mounting unit.

26. The emergency wheel attachment according to claim 25, wherein the nuts are cap nuts and wherein contained in each cap nut is an optical or acoustic display device signalling a correct mounting state.

27. The emergency wheel attachment according to claim 23, wherein latching devices, arranged on at least one of a side of the annular mounting unit and a side of the annular tread unit facing away from the vehicle wheel, are used to connect the annular tread unit to the annular mounting unit.

28. The emergency wheel attachment according to claim 27, wherein each latching device comprises a radially movable slider elastically pretensioned radially outwards, wherein the slider has a ramp which, on mounting of the annular tread unit, comes into contact with the latter, so that the slider is displaced radially inwards in the mounting process and, following mounting of the annular tread unit, slides radially outwards again on account of the elastic pretensioning and slides over the surface of the annular tread unit.

29. The emergency wheel attachment according to claim 23, wherein the annular tread unit is provided, on a side of the annular tread unit facing the vehicle wheel, with at least one self-bracing security claw for engaging behind the rim flange of the rim, and wherein the at least one security claw is arranged, in the circumferential direction of the emergency wheel attachment, between two of the at least one of the movable retaining claws.

30. The emergency wheel attachment according to claim 29, wherein the at least one security claw comprises an actuating slider, one end of which passes through a tread of the annular tread unit and protrudes radially from the tread, and the other end of which, upon radially inward displacement of the actuating slider, presses the at least one security claw behind the rim flange of the rim.

31. The emergency wheel attachment according to claim 30, wherein the actuating slider is elastically pretensioned radially outwards and has a locking device which, following a displacement of the actuating slider radially inwards, prevents the actuating slider from moving radially outwards.

32. The emergency wheel attachment according to claim 1, wherein the drive device is a drive pinion configured to be coupled to the actuating element and is connected to a cap nut in which a torque-limiting device is located.

33. The emergency wheel attachment according to claim 1, wherein the annular mounting unit has an annular housing in which the actuating element is arranged, and wherein a handle spanning the free center of the housing is attached to the housing.

* * * * *